(12) United States Patent
Danziger

(10) Patent No.: US 11,927,872 B2
(45) Date of Patent: Mar. 12, 2024

(54) DISPLAY WITH FOVEATED OPTICAL CORRECTION

(71) Applicant: Lumus Ltd., Ness Ziona (IL)

(72) Inventor: Yochay Danziger, Kfar Vradim (IL)

(73) Assignee: LUMUS LTD., Ness Ziona (IL)

( * ) Notice: Subject to any disclaimer, the term of this patent is extended or adjusted under 35 U.S.C. 154(b) by 238 days.

(21) Appl. No.: 17/622,257

(22) PCT Filed: Jun. 23, 2020

(86) PCT No.: PCT/IL2020/050700
§ 371 (c)(1),
(2) Date: Dec. 23, 2021

(87) PCT Pub. No.: WO2020/261268
PCT Pub. Date: Dec. 30, 2020

(65) Prior Publication Data
US 2022/0350219 A1    Nov. 3, 2022

Related U.S. Application Data

(60) Provisional application No. 62/872,738, filed on Jul. 11, 2019, provisional application No. 62/865,237, filed on Jun. 23, 2019.

(51) Int. Cl.
*G02F 1/1335* (2006.01)
*F21V 8/00* (2006.01)
(Continued)

(52) U.S. Cl.
CPC ............. *G02F 1/294* (2021.01); *G02B 6/003* (2013.01); *G02B 6/0031* (2013.01);
(Continued)

(58) Field of Classification Search
CPC ...... G02F 1/0136; G02F 1/294; G02F 1/1335; G02F 1/133504; G02F 1/133524;
(Continued)

(56) References Cited

U.S. PATENT DOCUMENTS

| 5,870,159 A | 2/1999 | Sharp |
| 7,643,214 B2 | 1/2010 | Amitai |

(Continued)

FOREIGN PATENT DOCUMENTS

| CN | 104570353 | 4/2015 |
| CN | 108107579 | 2/2021 |

(Continued)

OTHER PUBLICATIONS

Miaomiao Xu et al., "Methods of optimizing and evaluating geometrical lightguides with microstructure mirrors for augmented reality displays", Opt. Express, (Feb. 18, 2019), vol. 27, pp. 5523-5543, XP055779991 [A] 1-22 * DOI: http://dx.doi.org/10.1364/OE.27.005538.

(Continued)

*Primary Examiner* — Thoi V Duong
(74) *Attorney, Agent, or Firm* — Rivka Friedman

(57) ABSTRACT

A display system (500) for displaying an image to an eye of a user includes a light-guide optical element (LOE) (506) and an image projector (512) projecting image illumination of a collimated image into the LOE. The image projector includes an electrically-controllable variable lens (10, 13, 71, 77, 58A, 58B, 59, 58C, 58D, 58E, 58F1, 58F2, 58G1, 58G2, 58H, 1223). A controller (18) determines a current region of interest of the image, either from tracking of the user's eye or by analysis of the image content, and controls the variable lens so as to reduce aberrations in the current region of interest at the expense of increased aberration in at least one area of the image outside the current region of interest.

17 Claims, 16 Drawing Sheets

(51) Int. Cl.
| | |
|---|---|
| *G02B 27/00* | (2006.01) |
| *G02F 1/01* | (2006.01) |
| *G02F 1/29* | (2006.01) |
| *G06F 3/01* | (2006.01) |
| *G06V 10/25* | (2022.01) |
| *H04N 9/31* | (2006.01) |

(52) U.S. Cl.
CPC ....... *G02B 27/0093* (2013.01); *G02F 1/0136* (2013.01); *G06F 3/013* (2013.01); *G06V 10/25* (2022.01); *H04N 9/317* (2013.01); *G02F 1/133524* (2013.01); *G02F 1/133526* (2013.01); *H04N 9/3161* (2013.01)

(58) Field of Classification Search
CPC ............. G02F 1/133526; G02F 1/1336; G02F 1/133606; G02F 1/133607; G02B 3/14; G02B 5/3083; G02B 6/003; G02B 6/0031; G02B 26/0816; G02B 26/101; G02B 27/0093; G02B 27/0172; G02B 2027/0116; G02B 2027/0147; G02B 2027/0187; G06F 3/013; G06V 10/25; H04N 9/317; H04N 9/3161
See application file for complete search history.

(56) References Cited

U.S. PATENT DOCUMENTS

| | | | |
|---|---|---|---|
| 8,320,032 | B2 | 11/2012 | Levola |
| 9,377,623 | B2 | 6/2016 | Robbins et al. |
| 9,494,799 | B2 | 11/2016 | Robbins et al. |
| 9,766,463 | B2 | 9/2017 | Border et al. |
| 10,133,070 | B2 | 11/2018 | Danziger |
| 10,168,531 | B1 | 1/2019 | Trail et al. |
| 10,209,517 | B2 | 2/2019 | Popovich et al. |
| 10,520,731 | B2 | 12/2019 | Amitai et al. |
| 10,551,622 | B2 | 2/2020 | Robbins et al. |
| 10,816,809 | B2 | 10/2020 | Kim et al. |
| 11,327,312 | B2 | 5/2022 | Robaina et al. |
| 11,450,113 | B1 | 9/2022 | Vaziri |
| 2012/0300311 | A1* | 11/2012 | Simmonds ......... G02B 27/0172 359/630 |
| 2013/0077049 | A1 | 3/2013 | Bohn |
| 2014/0036361 | A1 | 2/2014 | Woodgate et al. |
| 2014/0098010 | A1 | 4/2014 | Travis |
| 2015/0185475 | A1 | 7/2015 | Saarikko et al. |
| 2015/0205126 | A1 | 7/2015 | Schowengerdt |
| 2015/0289762 | A1 | 10/2015 | Popovich et al. |
| 2015/0378515 | A1 | 12/2015 | Powell |
| 2016/0033698 | A1 | 2/2016 | Escuti et al. |
| 2016/0085300 | A1 | 3/2016 | Robbins et al. |
| 2016/0253934 | A1 | 9/2016 | Wu |
| 2018/0045960 | A1 | 2/2018 | Palacios et al. |
| 2018/0188631 | A1 | 7/2018 | Lu et al. |
| 2018/0232048 | A1 | 8/2018 | Popovich et al. |
| 2018/0246336 | A1 | 8/2018 | Greenberg |
| 2018/0284440 | A1 | 10/2018 | Popovich et al. |
| 2018/0284884 | A1 | 10/2018 | Sulai et al. |
| 2018/0292592 | A1 | 10/2018 | Danziger |
| 2018/0335629 | A1 | 11/2018 | Cheng et al. |
| 2019/0006600 | A1 | 1/2019 | Seifermann |
| 2019/0026864 | A1 | 1/2019 | Chen et al. |
| 2019/0056600 | A1 | 2/2019 | Danziger et al. |
| 2019/0171285 | A1 | 6/2019 | Sulai et al. |
| 2019/0187482 | A1 | 6/2019 | Lanman |
| 2019/0369403 | A1 | 12/2019 | Leister |
| 2020/0089319 | A1 | 3/2020 | Popovich et al. |
| 2020/0117006 | A1 | 4/2020 | Kollin et al. |
| 2020/0225475 | A1 | 7/2020 | Muenz |
| 2020/0233214 | A1 | 7/2020 | Jia et al. |
| 2020/0333606 | A1 | 10/2020 | Popovich et al. |
| 2020/0341269 | A1 | 10/2020 | Mills et al. |
| 2021/0033872 | A1 | 2/2021 | Rubin et al. |
| 2021/0247613 | A1 | 8/2021 | Hudman |

FOREIGN PATENT DOCUMENTS

| | | |
|---|---|---|
| EP | 3839607 | 6/2021 |
| JP | S61140925 A | 6/1986 |
| WO | 2021/124315 | 6/2021 |

OTHER PUBLICATIONS

Fernandes, Diego et al., "Influence of temperature on the refractive index sensitivities of fiber Bragg gratings refractometers", Journal of Microwaves, Optoelectronics and Electromagnetic Applications, (Jun. 30, 2017), vol. 16, No. 2, pp. 385-392, XP055779992 [A] 6, 20-22 * DOI: http://dx.doi.org/10.1590/2179-10742017v16i2785.

Jianming Yang et al, "Design of a large field-of-view see-through near to eye display with two geometrical waveguides", Optics Letters, US, (Nov. 16, 2016), vol. 41, No. 23, doi: 10.1364/OL.41. 005426, ISSN 0146-9592, p. 5426, XP055383187 [Y] 1-3,8-22 * p. 5427; figures 1,2 * DOI: http://dx.doi.org/10.1364/OL.41.005426.

Jianming Yang et al, "Polychromatic see-through near-eye display design with two waveguides and a large field-of-view", Proceedings of SPIE; [Proceedings of SPIE ISSN 0277-786X vol. 10524], SPIE, US, (Apr. 29, 2016), vol. 9896, doi: 10.1117/12.2227383, ISBN 978-1-5106-1533-5, pp. 989605-989605, XP060071032 [A] 1-22 * figure 1 * * 2.1 Geometry of the system * DOI: http://dx.doi.org/10.1117/12.2227383.

* cited by examiner

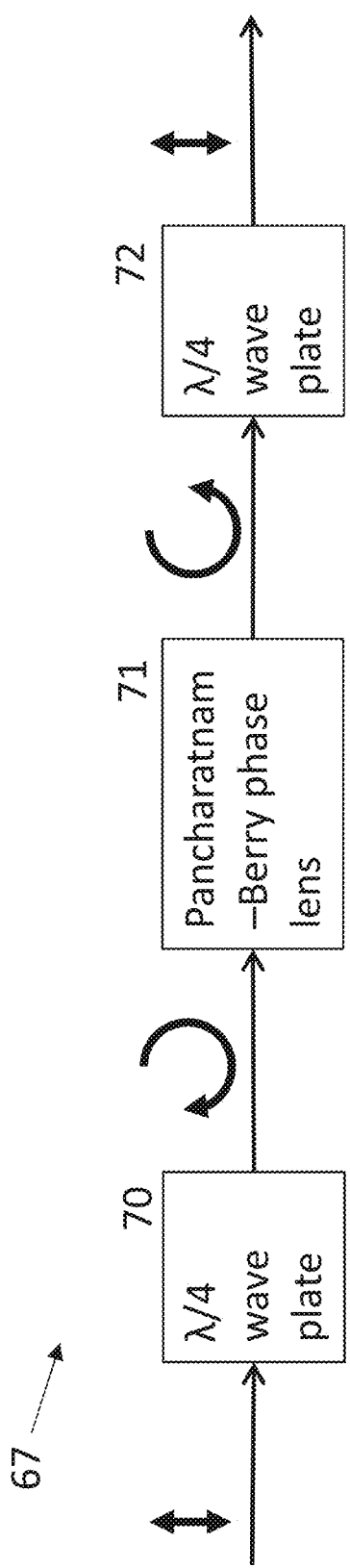
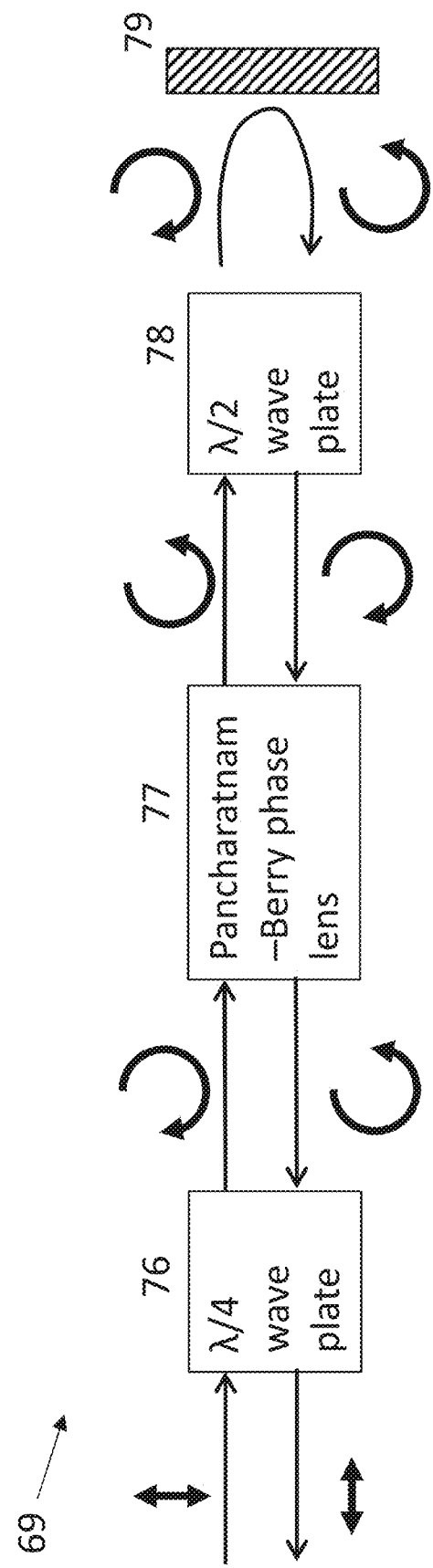
FIG. 2A
FIG. 2B

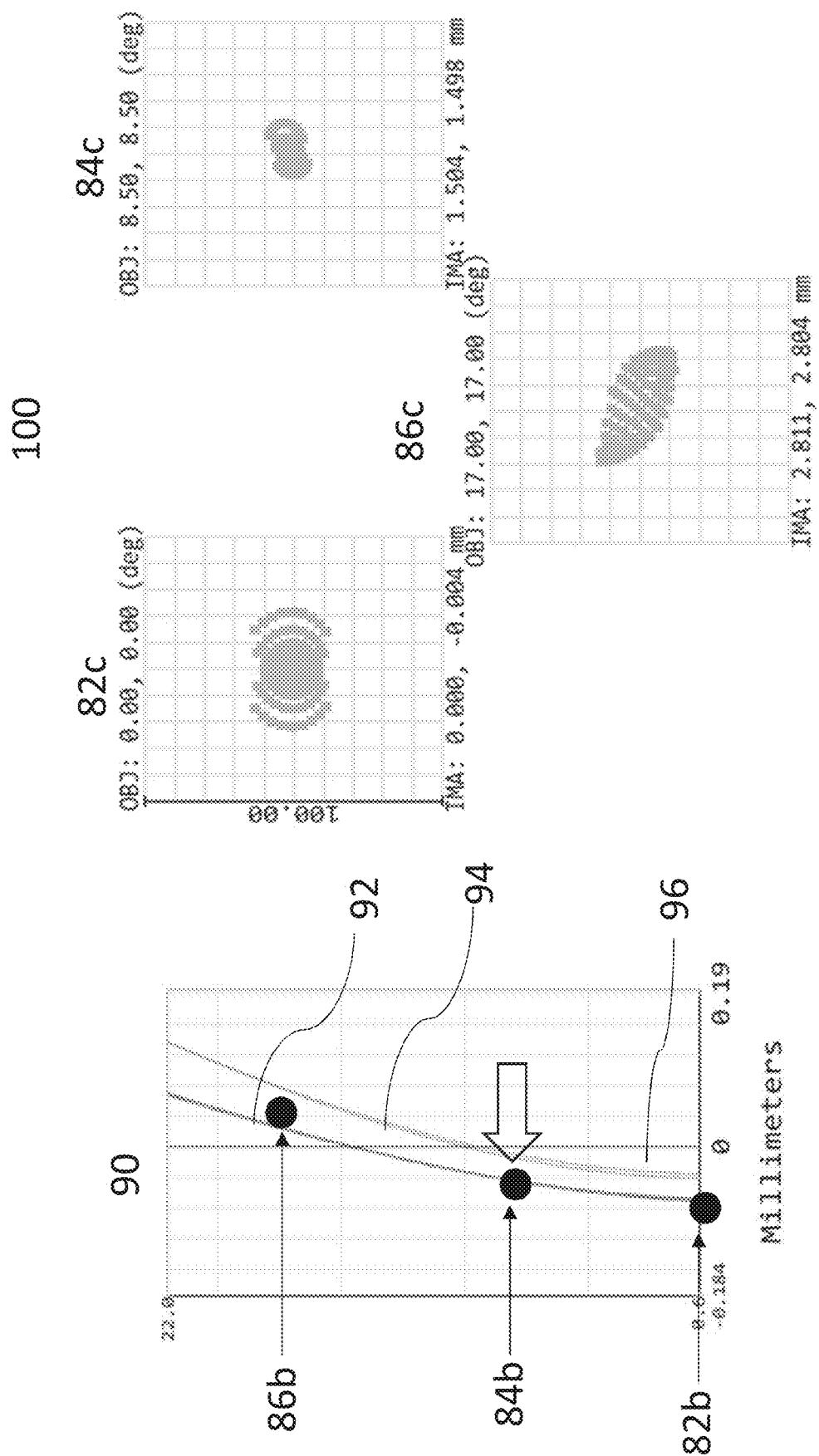

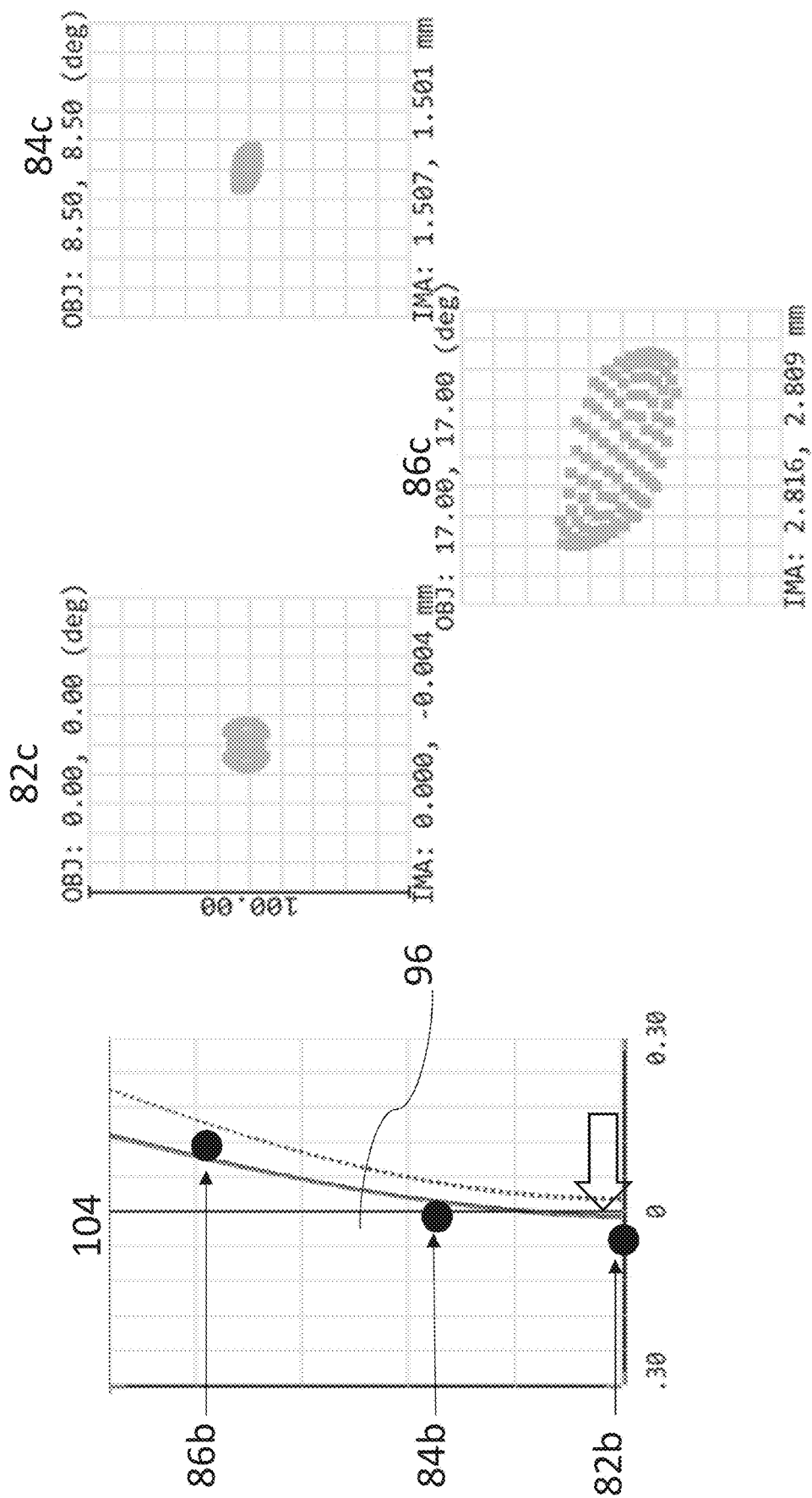

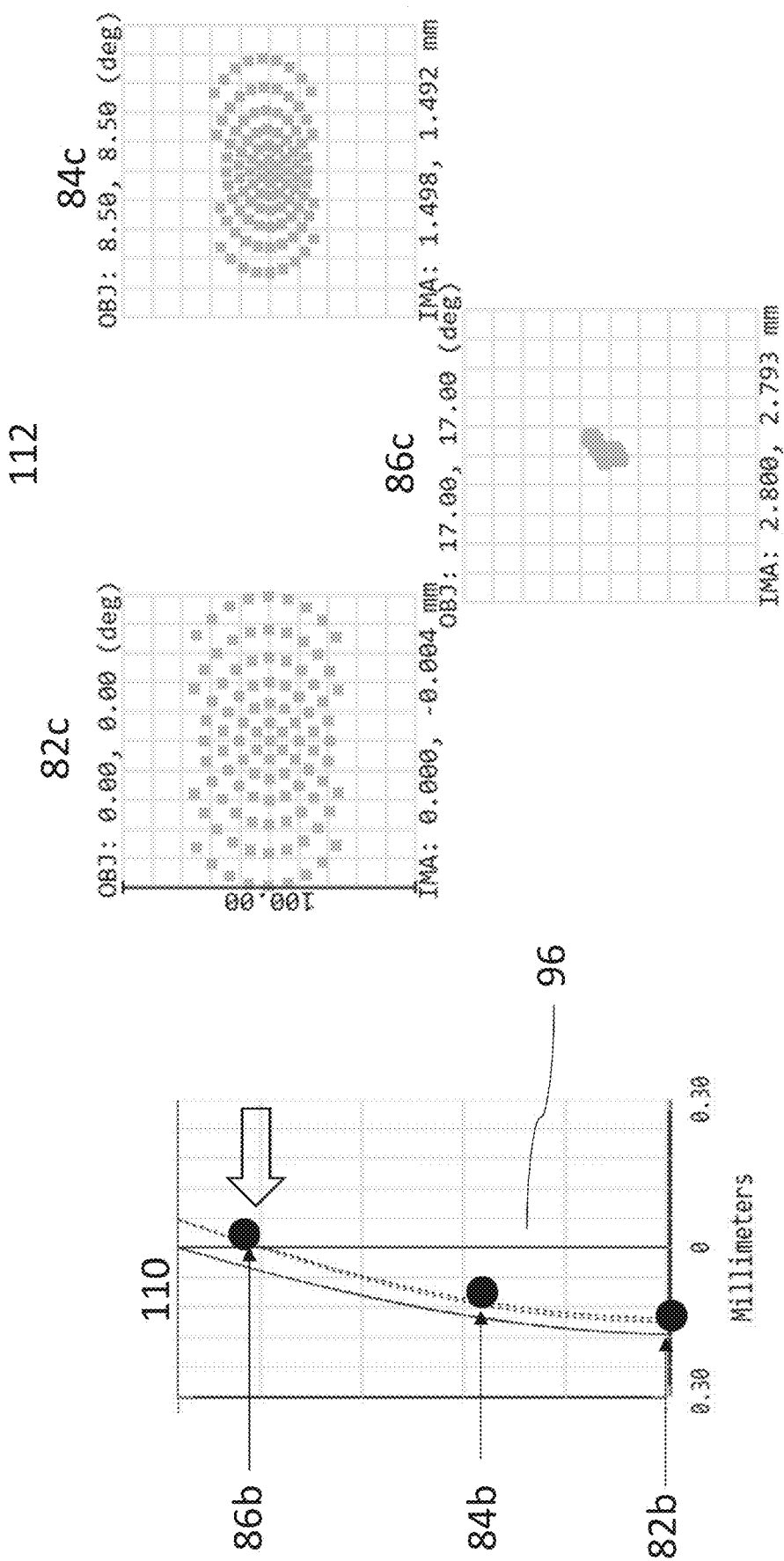

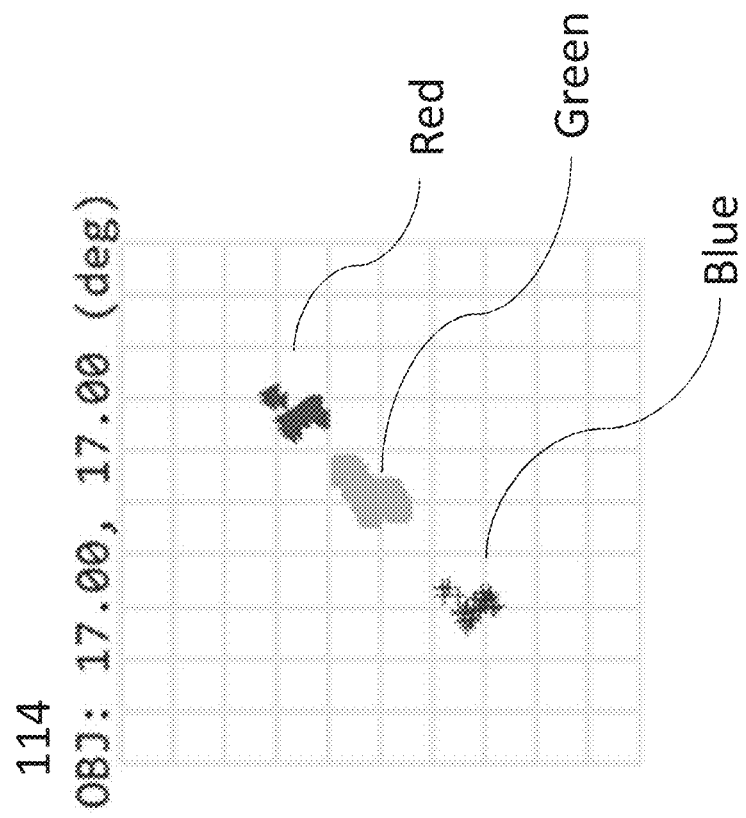
FIG. 4C(iv)

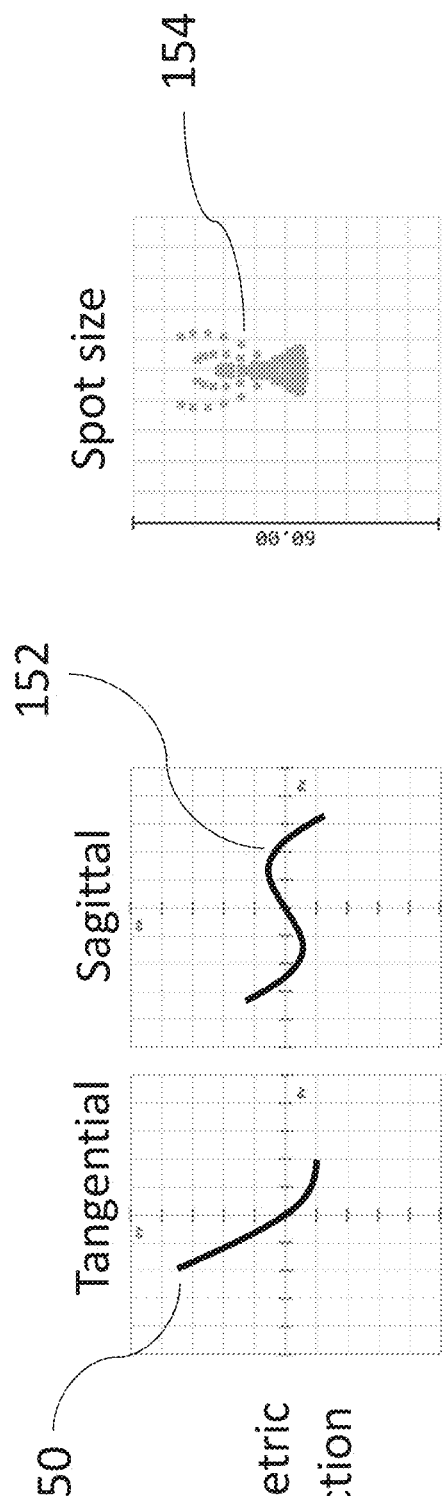
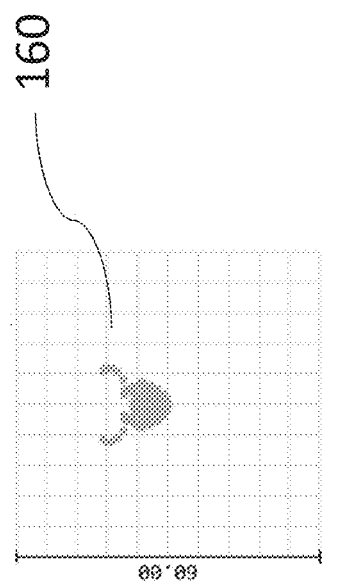
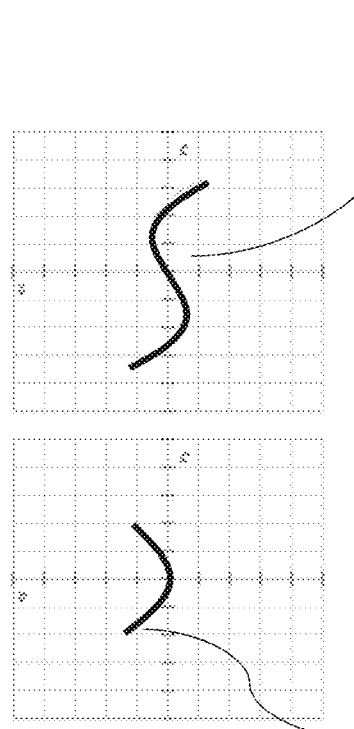
FIG. 5A(i)
FIG. 5A(ii)
FIG. 5B(i)
FIG. 5B(ii)

DISPLAY WITH FOVEATED OPTICAL CORRECTION

FIELD AND BACKGROUND OF THE INVENTION

Optical systems for near-eye displays project images from a small image generator onto eye-box area (eye-motion box or "EMB") corresponding to the estimated position of the eye-pupil of the observer. The optics used for this projection typically include some combination of mirrors, lenses and prisms. The image is typically delivered to the observer's eye by a combiner based on a transparent waveguide or a transparent reflector.

The optical arrangement is optimized to reduce optical aberrations in the projected image, including defocus, spherical, coma, astigmatism and more.

The larger the field projected, the more complicated it becomes to generate an aberration-free image, or at least, in which aberrations are kept to a level acceptable to the observer. The optical system can be optimized for minimal aberrations at the center of the field. However, large, complicated and expensive optics are required to maintain a good image all across the entire field. Furthermore, different wavelengths will experience different optical power resulting in chromatic aberrations. Thermal changes of the optical system also generate variations in optical power, thereby shifting the optical system away from its nominal (minimal aberrations) position.

Waveguide based systems include an image projector that couples a collimated image (image at infinity) into a waveguide. An additional cause of poor image quality is the injection of a non-collimated (i.e., imperfectly collimated) image into the waveguide.

Eye-tracking sub-systems are commonly introduced into near-eye display systems. Therefore, the direction of observation (current "line of sight") is typically known to the system with low latency.

SUMMARY OF THE INVENTION

The present invention is a display system and corresponding methods for displaying an image to an eye of a user.

According to the teachings of an embodiment of the present invention there is provided, a display system for displaying an image to an eye of a user, the eye being located within an eye motion box, the display system comprising: (a) a light-guide optical element (LOE) having a pair of major external surfaces that are parallel; (b) an image projector projecting image illumination of a collimated image, the image projector being optically coupled to the LOE so as to introduce the image illumination into the LOE so as to propagate within the LOE by internal reflection at the pair of major external surfaces, the image projector including an electrically-controllable variable lens; (c) a coupling-out configuration associated with at least a coupling-out region of the LOE, the coupling-out configuration being configured to redirect at least part of the image illumination propagating within the LOE towards the eye motion box for viewing by the eye of the user; and (d) a controller comprising at least one processor, the controller associated with the electrically-controllable variable lens and configured to: (i) determine a current region of interest of the image, and (ii) generate an actuation signal to vary a property of the electrically-controllable variable lens so as to reduce at least one type of aberration in the current region of interest of the image as viewed by the eye of the user at the expense of increased aberration in at least one area of the image outside the current region of interest.

According to a further feature of the present invention, there is also provided an eye tracking arrangement deployed for tracking a current line of sight of the eye of the user, and wherein the controller determines the current region of interest based upon an input received from the eye tracking arrangement.

According to a further feature of the present invention, the image is a video image, and wherein the controller processes content of the video image to derive the current region of interest.

According to a further feature of the present invention, the image is a video image, and wherein the controller receives a data stream indicative of a current region of interest associated with the video image.

According to a further feature of the present invention, the at least one optical aberration varies across a field of the collimated image from the image projector, and wherein the electrically-controllable variable lens has a variable optical power along at least one axis, the controller varying the optical power so as to reduce the at least one optical aberration in a region of the collimated image corresponding to the current region of interest.

According to a further feature of the present invention, there is also provided a temperature sensor generating a signal indicative of temperature, wherein the controller is responsive to the signal indicative of temperature to vary the optical power so as to at least partially compensate for temperature-related variations in optical properties of the image projector.

According to a further feature of the present invention, the image projector sequentially projects image illumination for different colors in different time periods, and wherein the controller varies the optical power synchronously with the time periods to provide color-specific aberration compensation.

According to a further feature of the present invention, the controller is further configured to store a value indicative of a required correction for manufacturing tolerances of the image projector, the controller being further configured to actuate the electrically-controllable variable lens to provide both a correction for the manufacturing tolerances of the image projector and to reduce the at least one optical aberration in a region of the collimated image corresponding to the current region of interest.

According to a further feature of the present invention, there is also provided a user input device associated with the controller, and wherein the controller is responsive to a user input provided via the user input device during a calibration process to store a new value indicative of a required correction for manufacturing tolerances of the image projector.

According to a further feature of the present invention, a focal field of the collimated image from the image projector is non-uniform, and wherein the electrically-controllable variable lens has a variable focal length, the controller varying the focal length so as to enhance collimation of the collimated image in the region of interest.

According to a further feature of the present invention, a uniformity of the image observed at the eye motion box varies across the field of the image as a function of a polarization of the image illumination introduced into the LOE, and wherein the electrically-controllable variable lens is a variable polarization-modifying lens, the controller varying the variable polarization-modifying lens so as to reduce non-uniformity in a region of the image corresponding to the current region of interest.

According to a further feature of the present invention, the image projector comprises a narrow beam illumination source and a scanning arrangement for generating a scanning pattern of the narrow beam across the angular field of the image, and wherein the electrically-controllable variable lens is deployed in a light path between the narrow beam illumination source and the scanning arrangement or is adjacent to the scanning arrangement.

According to a further feature of the present invention, the image projector comprises a spatial light modulator and collimating optics, and wherein the electrically-controllable variable lens is deployed in a light path between the collimating optics and the LOE or is integrated with the collimating optics.

According to a further feature of the present invention, the image projector comprises: (a) a narrow beam illumination source; (b) a scanning arrangement for generating a scanning pattern of the narrow beam across the angular field of the image so as to generate a real image at an image plane; and (c) collimating optics collimating image illumination from the image plane so as to be introduced into the LOE as a collimated image, wherein the electrically-controllable variable lens is deployed in a light path between the image plane and the LOE, and wherein the display system further comprises a second electrically-controllable variable lens deployed in a light path between the narrow beam illumination source and the image plane.

According to a further feature of the present invention, the coupling-out configuration comprises a plurality of mutually-parallel partially reflective surfaces within the LOE, the partially reflective surfaces being oblique to the major external surfaces.

According to a further feature of the present invention, the coupling-out configuration comprises a diffractive optical element associated within the LOE and configured to couple out a proportion of the image illumination.

There is also provided according to the teachings of an embodiment of the present invention, a method for displaying an image to an eye of a user, the eye being located within an eye motion box, the method comprising the steps of: (a) providing a display system comprising: (i) a light-guide optical element (LOE) having a pair of major external surfaces that are parallel, (ii) an image projector projecting image illumination of a collimated image, the image projector being optically coupled to the LOE so as to introduce the image illumination into the LOE so as to propagate within the LOE by internal reflection at the pair of major external surfaces, the image projector including an electrically-controllable variable lens, and (iii) a coupling-out configuration associated with at least a coupling-out region of the LOE, the coupling-out configuration being configured to redirect at least part of the image illumination propagating within the LOE towards the eye motion box for viewing by the eye of the user; (b) determining a current region of interest of the image; and (c) varying a property of the electrically-controllable variable lens as a function of the current region of interest of the image so as to reduce at least one optical aberration in the region of interest at the expense of a reduction in viewed image quality in at least one other region of the image.

According to a further feature of the present invention, the current region of interest is determined by sensing a current line of sight of the eye of the user.

According to a further feature of the present invention, the image is a video image, and wherein the current region of interest varies as a function of the content of the video image.

There is also provided according to the teachings of an embodiment of the present invention, a display system for displaying an image to an eye of a user, the eye being located within an eye motion box, the display system comprising: (a) a light-guide optical element (LOE) having a pair of major external surfaces that are parallel; (b) an image projector projecting image illumination of a collimated image, the image projector being optically coupled to the LOE so as to introduce the image illumination into the LOE so as to propagate within the LOE by internal reflection at the pair of major external surfaces, the image projector including an electrically-controllable variable lens having variable optical power along at least one axis; (c) a coupling-out configuration associated with at least a coupling-out region of the LOE, the coupling-out configuration being configured to redirect at least part of the image illumination propagating within the LOE towards the eye motion box for viewing by the eye of the user; (d) a temperature sensor generating a signal indicative of a temperature of at least part of the display system; and (e) a controller comprising at least one processor, the controller associated with the temperature sensor and the electrically-controllable variable lens, the controller being responsive to the signal indicative of a temperature to generate an actuation signal to vary the optical power so as to at least partially compensate for temperature-related variations in optical properties of the image projector.

According to a further feature of the present invention, the controller is further configured to store a value indicative of a required correction for manufacturing tolerances of the image projector, the controller being further configured to actuate the electrically-controllable variable lens to provide both a correction for the manufacturing tolerances of the image projector and at least partial compensation for the temperature-related variations in optical properties of the image projector.

According to a further feature of the present invention, there is also provided a user input device associated with the controller, and wherein the controller is responsive to a user input provided via the user input device during a calibration process to store a new value indicative of a required correction for manufacturing tolerances of the image projector.

BRIEF DESCRIPTION OF THE DRAWINGS

The invention is herein described, by way of example only, with reference to the accompanying drawings, wherein:

FIGS. 2A and 2B are schematic representations of the operation of a Pancharatnam-Berry phase lens in the context of the present invention, illustrated in a transmission configuration and a reflection configuration, respectively;

FIGS. 4A(ii), 4B(ii) and 4C(ii) are graphs illustrating focal depth as a function of off-axis angle at the entrance aperture of a waveguide as corrected by a variable lens for successive points of the exemplary points of FIGS. 4A(i), 4B(i) and 4C(i);

FIGS. 4A(iii), 4B(iii) and 4C(iii) are enlarged plots of the angular spread of the three exemplary points for the three correcting states of the variable lens;

FIG. 5A(i) is a graphic representation of plots of focal plane dot position as a function of position across the aperture for the peripheral exemplary point of FIG. 4C(i) for tangential and sagittal aberrations;

FIG. 5B(i) is similar to FIG. 5A(i) after addition of a cylindrical correction;

FIGS. 5A(ii) and 5B(ii) are illustrations of the corresponding spot sizes corresponding to FIGS. 5A(i) and 5B(i), respectively;

DESCRIPTION OF THE PREFERRED EMBODIMENTS

The present invention is a display system and corresponding methods for displaying an image to an eye of a user.

The principles and operation of display systems according to the present invention may be better understood with reference to the drawings and the accompanying description.

Figure 1B:
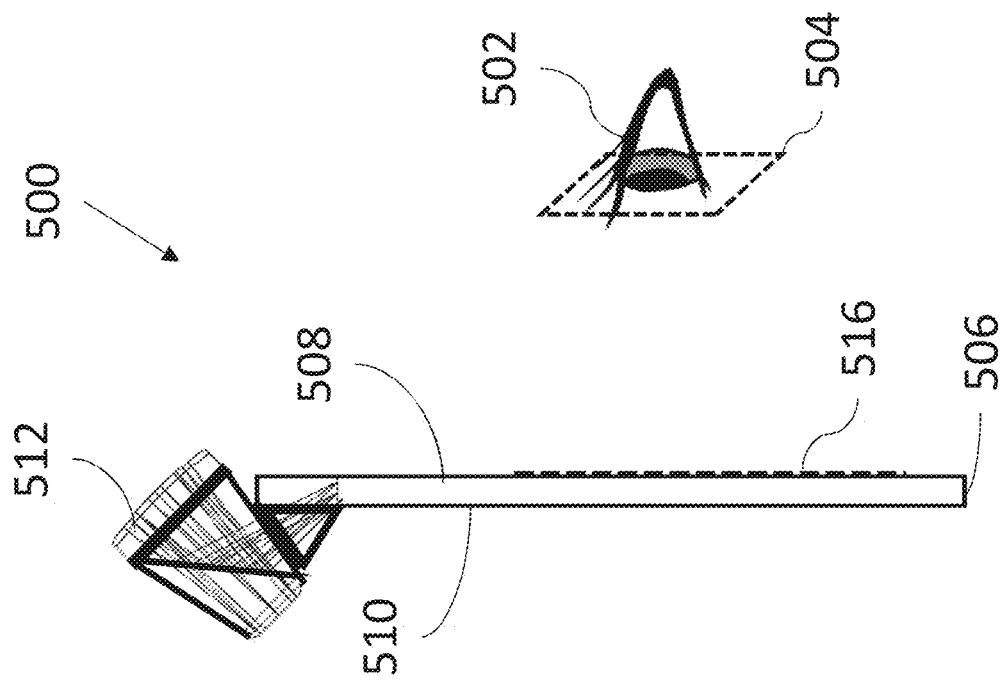
FIGS. 1A and 1B are schematic side views of a display system, constructed and operative according to an embodiment of the present invention, for displaying an image to an eye of a user, where coupling of the image from a waveguide towards the eye is achieved by a reflective arrangement and by a diffractive arrangement, respectively.
Figure 1A:
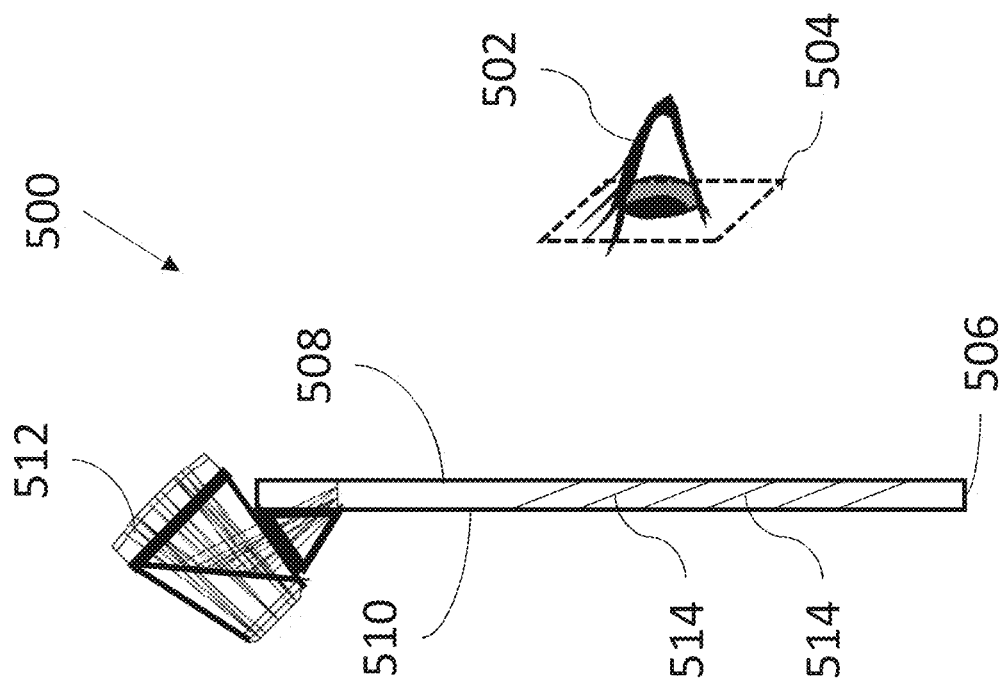
Figure 1C:
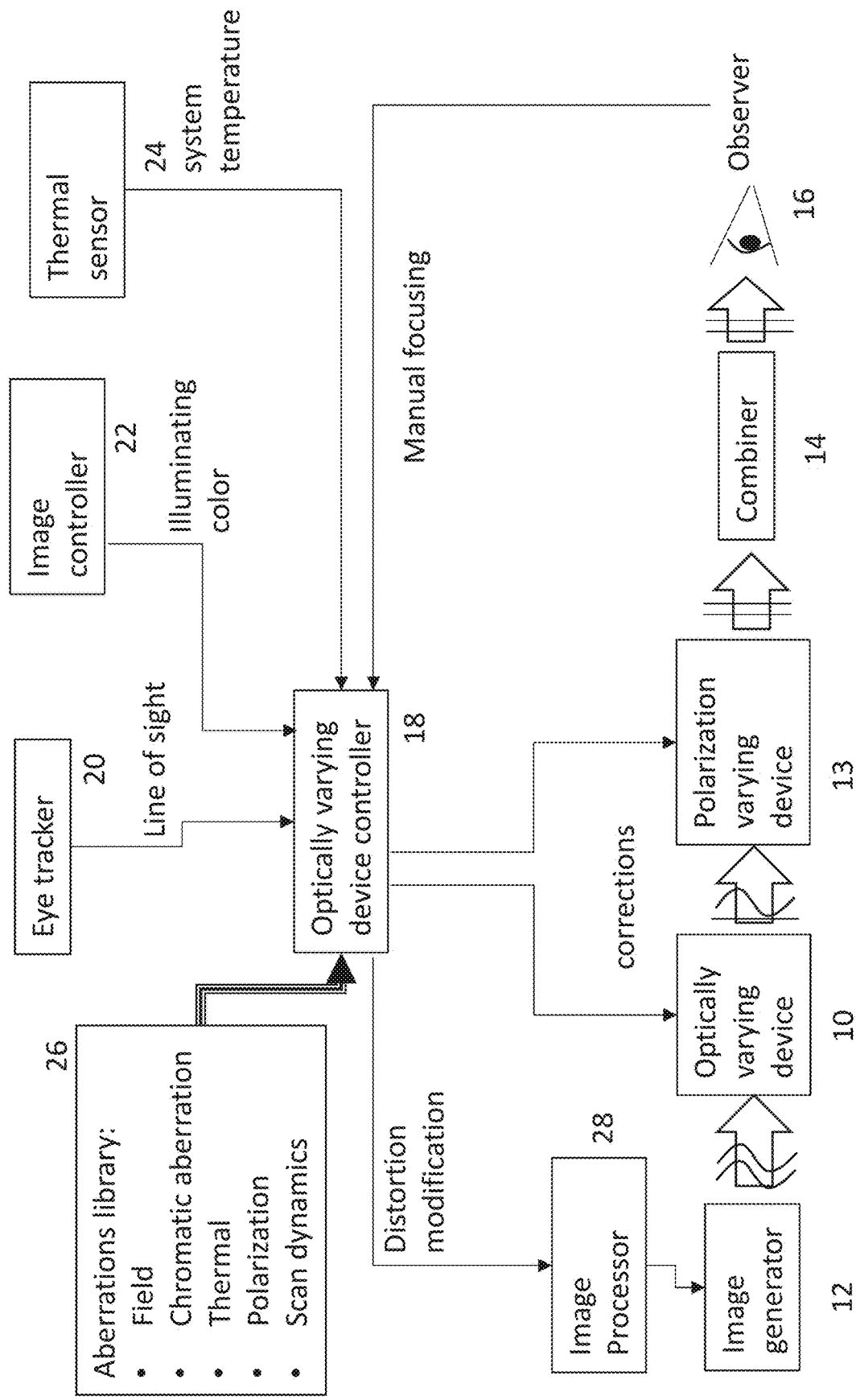
FIG. 1C is a block diagram of an implementation of the display system of FIGS. 1A and 1B.

Referring now to the drawings, FIGS. 1A and 1B show a schematic overview of the major optical components of the system, while FIG. 1C is a block diagram of the system according to certain embodiments of the present invention.

In general terms, the invention is exemplified herein with reference to a display system 500 for displaying an image to an eye 502 of a user, the eye being located within an eye motion box 504. The display system includes a light-guide optical element (LOE) 506 having a pair of major external surfaces 508, 510 that are parallel to each other. An image projector 512 projecting image illumination of a collimated image is optically coupled to LOE 506 so as to introduce the image illumination into the LOE so as to propagate within the LOE by internal reflection at major external surfaces 508, 510. The image projector 512 is referred to interchangeably as a "POD".

A coupling-out configuration, associated with at least a coupling-out region of LOE 506, is configured to redirect at least part of the image illumination propagating within the LOE towards the eye motion box 504 for viewing by the eye 502 of the user. Typical implementations of the coupling-out configuration include a reflective coupling-out arrangement implemented, for example, as a plurality of mutually-parallel partially reflective surfaces 514, oblique to major external surfaces 508, 510, within the LOE 506, as illustrated in FIG. 1A. An alternative coupling-out arrangement employs one or more diffractive optical element 516, associated with LOE 506 and configured to couple out a proportion of the image illumination, as illustrated in FIG. 1B. Details of implementations of both reflective and diffractive coupling-out arrangements for guided-light displays are well known in the field, and in the interest of conciseness, will not be described here in detail.

It is a particularly preferred feature of certain embodiments of the present invention that image projector 512 includes at least one electrically-controllable variable lens. The at least one electrically-controllable variable lens is represented schematically in FIG. 1C by optically varying device 10 and/or polarization varying device 13. Various examples of the structure, function and positioning of the at least one electrically-controllable variable lens will be discussed below, but in particularly preferred implementations of the present invention, the variable lens is positioned in the light path before the collimated image enters the LOE.

In general terms, the variable lens facilitates certain corrections and/or adjustments of the output image of the image projector 512 so as to improve the perceived quality of the image viewed by the user. In most implementations, the variable lens operates under the control of a controller 18, which includes at least one processor. According to a first aspect of the present invention, controller 18 is configured to determine a current region of interest of the image, and to generate an actuation signal to vary a property of the electrically-controllable variable lens so as to reduce at least one type of aberration in the current region of interest of the image as viewed by the eye of the user at the expense of increased aberration in at least one area of the image outside the current region of interest.

The present invention takes advantage of the observation that human eyesight is sensitive to image quality at the fovea, corresponding to a narrow field located at the center of the observation line of sight, while peripheral vision is much less sensitive to image quality.

According to this aspect of this invention, an adaptive optical component (variable lens) is actuated to continuously modify optical properties of the projector in order to minimize or reduce aberrations at a field-of-interest or "region of interest", where image quality is most needed, at the expense of exacerbating the aberrations in other regions, e.g., peripheral regions of the user's field of view, where the degradation of the image is typically not perceived, or is at least less critical. This approach allows the use of an optical system which has more significant aberrations than would otherwise be tolerated, thereby allowing the use of smaller, cheaper and/or more compact optics. It should be noted that the phrases "region of interest" and "field of interest" are used herein interchangeably. The term "region" refers to a region of the image, whereas "field" refers to an angular region of the user's field of view. Since however the images coupled out of the LOE are collimated to infinity, a "region" of the image is fully defined by the corresponding angular "field".

The region of interest may be derived in a number of ways. In one set of implementations, where an eye tracking arrangement is deployed for tracking a current line of sight of the eye of the user, controller 18 preferably determines the current region of interest based upon an input received from the eye tracking arrangement. Since most aberrations vary relatively smoothly across the field of view, optimizing for an estimated current line of sight is sufficient to provide a reduction in the aberration over a large enough area to allow for line of sight measurement errors and the dimensions of the foveal vision region.

In other implementation, particularly useful in cases in which real-time eye tracking data is not available, the region of interest is defined according to the content of the images displayed. Thus, for example, is a region of an image has textual subtitles, the area of the subtitles may be assumed to be of high priority to provide aberration reduction for improved clarity. Similarly, in augmented reality applications in which only a part of the display area is used at a given moment for display of information or objects superimposed on the real world, the area or areas currently displayed are given priority over display regions not currently active. The region of interest can be defined either as a centroid of the currently active regions, or by employing further algorithms to prioritize between those active regions according to content.

Analysis of the image content to determine a current region of interest may be performed in real-time by controller 18, typically by implementing suitable image processing algorithms. These algorithms implement the aforementioned analysis, and other similar analysis to identify areas of likely interest in the image and to define the region of interest accordingly. This typically includes searching for one or more of: currently active regions of the display; regions of the image including text or other high-resolution image elements; regions of the image including faces; and regions of the image with motion relative to preceding frames of a video image. All of these image processing algorithms are straightforward to implement using well known image processing technology, and may be performed using functions from standard image processing libraries. Priorities between the different types of content can be chosen by the system designer according to the intended use of the system, and the system may be switchable between two or more modes according to the current use of the system, either automatically based on detecting the type of image content, or by user input.

Alternatively, in some cases, a preselected definition of the region of interest may be provided to controller 18 as a data stream indicative of a current region of interest associated with the video image. The data stream may optionally be encoded together with a video source, or in the case of dynamically generated graphics, may be provided as an additional output by the processor generating the graphic elements to be displayed.

It should be noted that the term "controller" is used here to refer to a device which generates an actuating signal which directly or indirectly adjusts the properties of the variable lens. The controller typically includes one or more processor, one or more data storage device, and various interfaces for inputs and outputs, all as is known in the art. Physically, the controller may be a single unit or may its functions may be subdivided between two or more units, and the controller may be integrated with a processing system which performs various additional functions related, for example, to driving the image projector or any other required functions. The processor may be located as a part of the display assembly, or it may be subdivided between different locations linked by suitable communications links, with its various functions subdivided in any manner desired. The processor or processors may be any type of processors, including general purpose processors operating under a suitable operating system and configured by suitable software, or as dedicated hardware, or by any combination of hardware and software.

The term "adjustable lens" is used herein as a generic term to refer to any device which modifies the phase content of light passing through, or reflected at, an aperture. The "adjustable lens" includes lenses having adjustable optical power along at least one axis, and devices having a variable affect on the polarization of light. Examples of such devices are discussed below.

The term light-guide optical element (LOE) is used interchangeably herein with "waveguide" and "substrate" to refer to a light guide element bounded by at least two major planar parallel external surfaces within which a collimated image propagates by internal reflection. For augmented reality applications, the LOE is also referred to as a "combiner" in that it combines the projected image with a view of the real world. The use of planar parallel surfaces together with a collimated image facilitates aperture expansion by partial coupling-out of the image illumination over an extended area of the substrate. Optionally, the LOE may include more than one set of features deployed to achieve aperture expansion in more than one dimension, such as is described in PCT patent application publication no. WO 2020/049542 (which was unpublished on the priority date of this application and is not prior art).

The "image" referred to in this application may be any image which covers either the entirety of the area of the display or any region within the display area. The image is typically part of a series of images or frames providing an apparently time-varying image, referred to as a "video image", or simply "video". It should be noted that the images and/or video do not need to be full frame (e.g., rectangular) images, and may instead define various isolated regions, graphic elements or objects to be displayed. Furthermore, the images or video need not be stored or streamed in a graphic format, and may instead be generated using vector graphics and/or any other rendering hardware or software. In each case, the signal to be presented to the eye of the user is a graphic output, typically defined as a set of pixel locations and intensity/color values, which is referred to herein as an "image."

The extent of the "region of interest" for which aberrations are reduced is not necessarily clearly delimited, depending upon the spatial variation of the aberration in question. In many cases, the region of interest may be defined by a particular direction, e.g., the center of the region of interest, for which the aberration reduction is optimized, and the impact of the correction on the remainder of the field follows inherently. Since however the aberrations addressed in this aspect of the invention are those that vary across the field of view, the adjustment typically optimizes the aberration reduction for a given type of aberration over a minority of the angular field of view, and causes an increase in the same aberration in at least one other region within the field of view.

Turning now to FIG. 1C in more detail, this shows schematically the components of a non-limiting implementation of the system.

The optically varying device 10 and polarization varying device 13 modify the optical properties of the image transmitted by image generator 12. The modified image is transmitted to the combiner (e.g., waveguide) 14 and to the observer's eye 16. Controller 18 (controlling devices 10 and 13) preferably receives some or all of the following real time parameters:

1. Orientation of the observer's line-of-sight. This information is provided by the eye tracker system 20. (Notably, the present invention requires only fairly low-resolution eye tracking information, indicative of the region of interest towards which the observer is looking. For example, an accuracy of roughly 5 degrees is typically sufficient for implementations of the present invention.

2. Instantaneous color illumination: systems illuminating in color sequence, transmit the different color images (red, green and blue) at different time slots. Synchronization information regarding which specific color is illuminating at a specific time slot is preferably received from the image controller 22.

3. System temperature: The parameter detected by one or more temperature sensor 24 located at critical position(s) on the system.

Simulations or testing of the system can be used to generate look-up tables for the required corrections of aberrations generated by the above parameters: line-of-sight (field), color and temperature. In most cases the required corrections for the various parameters are additive however more elaborate correction matrices can be saved to system memory/data storage 26. Controller 18 can thus actuate the variable lenses to optimize optical image quality at the part of the field that is of interest. The look-up tables may take into consideration a range of different types of aberrations, which may also include aberrations relating to scan dynamics for a scanning system.

In the case of operation based on eye tracking, during operation, controller 18 receives input of line of sight from eye tracker 20, and actuates one or both of devices 10 and 13 to optimize the focus and/or optical power along at least one axis and/or polarization for minimum aberrations and/or maximum signal strength in the current region of interest towards which the observer is looking. The correction may preferably also take into account the outputs of image controller 22 and thermal sensor 24, and retrieve the appropriate correction from an aberrations library stored in data storage 26. The fact that the adjustment is optimized for a certain region of the field of view typically results in reduced image quality in other regions of the field of view. However, since those regions are not currently near the line of sight of the observer, the reduced quality in the peripheral field is well tolerated and typically not even noticeable.

Introducing optical correction by device 10 in some cases also introduces some distortion to the image. This distortion typically appears as image shift at the local narrow field of interest (at line of sight). This shift can generate misalignment in case of binocular system having different corrections for the two projectors. To address this, a distortion map is preferably also saved by memory 26 so driver 18 can transmit a predicted distortion (or the correction therefor) to an image processor module 28 for pre-compensation.

Various devices and technologies may be used to implement the electrically-controllable variable lens for improving optical properties within the field of interest. Mechanical lens movement by a voice coil or a piezo actuator are options but can be limited in speed and reliability. A more preferable option is a capacitor-based device such as VARIOPTIC© commercially available from CORNING© (US) or a focus-tunable lens commercially available from OPTOTUNE©. A further preferred option is a liquid crystal-based component that can be used at high speed with minimal degradation effects. For example, the focusing lens described in patent application publication no. WO 2006/022346 may be used to advantage. Alternatively, a more complicated correction function such as astigmatism and spherical, can be implemented using one or more Pancharatnam-Berry phase (PBP) lens (also referred to as a "geometric phase lens"). A further preferred option is a controllable liquid-crystal lens, such as those commercially available from DeepOptics Ltd. (Israel).

Optionally, a user input (not shown) may be provided to allow user feedback to the controller 18 for focus adjustment. This manual focus adjustment input can provide calibration to compensate for degradation of optical quality of the device over time.

FIGS. 2A and 2B illustrate schematically the polarization aspect of implementing this system based on a PBP lens, but can be adapted to other polarization-based devices. FIG. 2A illustrates a configuration 67 with a pass-through implementation where linear polarization enters a λ/4 wave plate 70 and is converted to circular polarized light. This light passes through the PBP lens 71, acquires optical power as needed (not shown) and a reversed circular polarization. If needed, another λ/4 wave plate 72 is employed to convert the output image to linearly polarized.

Integration of a PBP lens into polarizing beam splitter (PBS) is shown as scheme 69 in FIG. 2B. Linear polarized input light passes through a λ/4 wave plate 76 and through the PBP lens 77 to become circularly polarized as in FIG. 2A, in addition to being acted on by the optical power of the PBP lens. Here, a λ/2 wave plate 78 reverses polarization orientation and a reflector 79 reverses the polarization orientation once more. As the light passes back through the components it acquires more optical power and emerges with a linear polarization orthogonal to the incident light. In some implementations, this latter configuration may be advantageous, offering twice the optical power correction for a given adjustable lens device.

Figure 3:
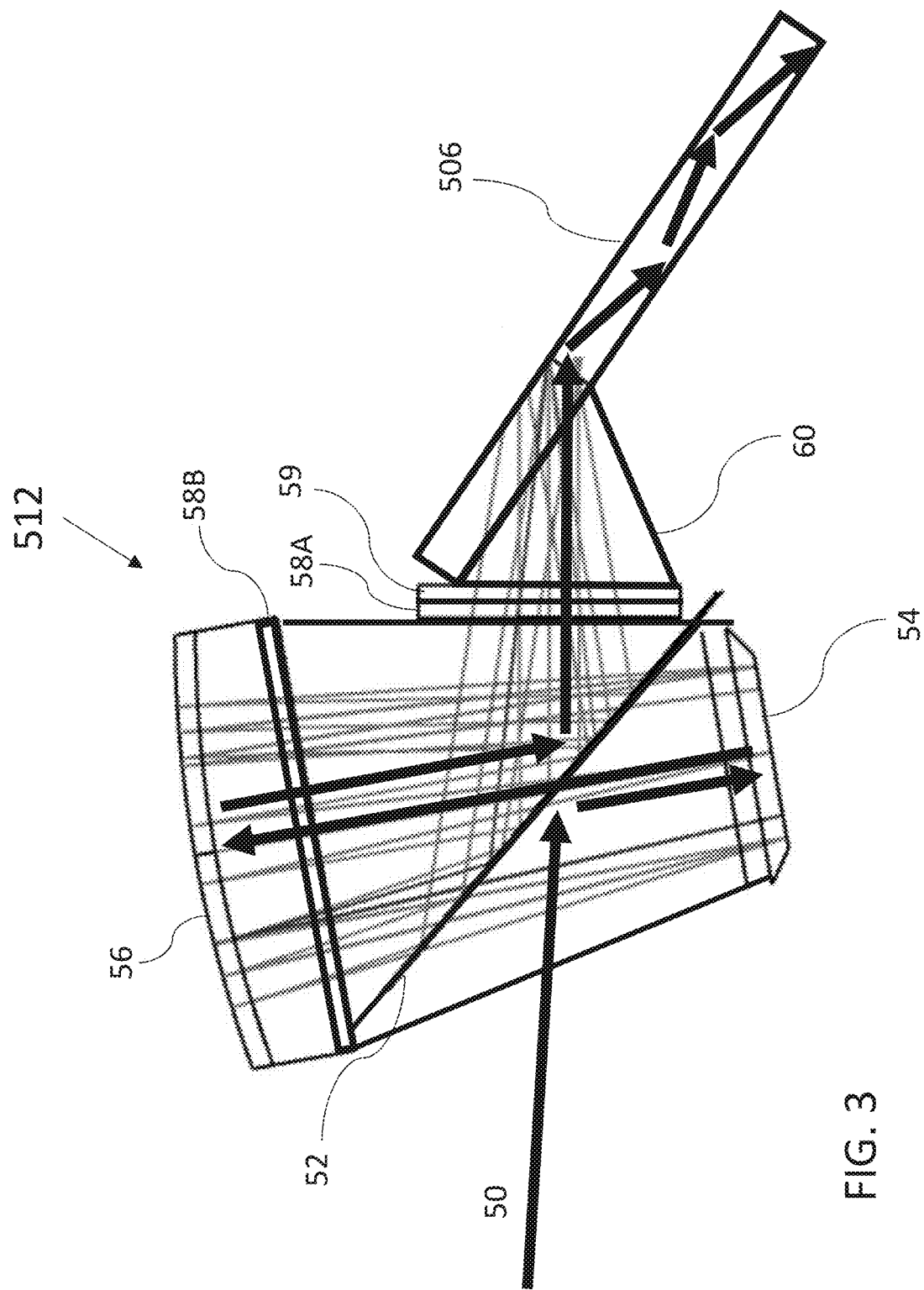
FIG. 3 is an enlarged partial view of an image projector according to an implementation of the system of FIGS. 1A and 1B illustrating positioning of adjustable optical devices according to an embodiment of the present invention.

An example of an optical system using the present invention is shown in FIG. 3. This system is based on a projector 512 introducing image illumination into a waveguide (LOE 506). The image illumination into the waveguide must be collimated (image at infinity) in the region of the field of view corresponding to the region of interest (around the current line of sight of the observer).

In the non-limiting example of an optical arrangement based on a polarizing beam splitter prism, illumination light 50 (from a source not shown) reflects from polarization beam splitter (PBS) 52 onto image generating matrix 54 (for example an LCOS spatial light modulator). Alternatively, the source of illumination 50 can be a scanning laser beam (not shown here, but discussed further below), in which case 54 is typically a reflector, a diffuser, or most preferably a micro-lens array (MLA), combined with a quarter-wave plate. The image light is reflected through PBS 52 onto reflecting lens 56 (preferably spherical shape for minimal cost), and back to PBS 52. The light reflects from PBS 52 and is coupled into waveguide 506 via any suitable coupling arrangement such as, for example, a coupling prism 60.

Where a polarization varying device (device 13 of FIG. 1C) is desired, it is preferably implemented as a liquid crystal device positioned as designated 59. Optical power modification (device 10 of FIG. 1C) for aberration compensation can be implemented using an adjustable lens deployed at 58A (equivalent to scheme 67 described above in FIG. 2A) or at 58B (equivalent to scheme 69 described above in FIG. 2B). In the event that it is deployed at 58B, the polarization shift required for correct routing of the optical path at PBS 52 is preferably provided by the configuration shown in scheme 69. Otherwise, another quarter-wave plate is deployed in front of the reflecting lens 56, as is known in the art.

Figure 4A:
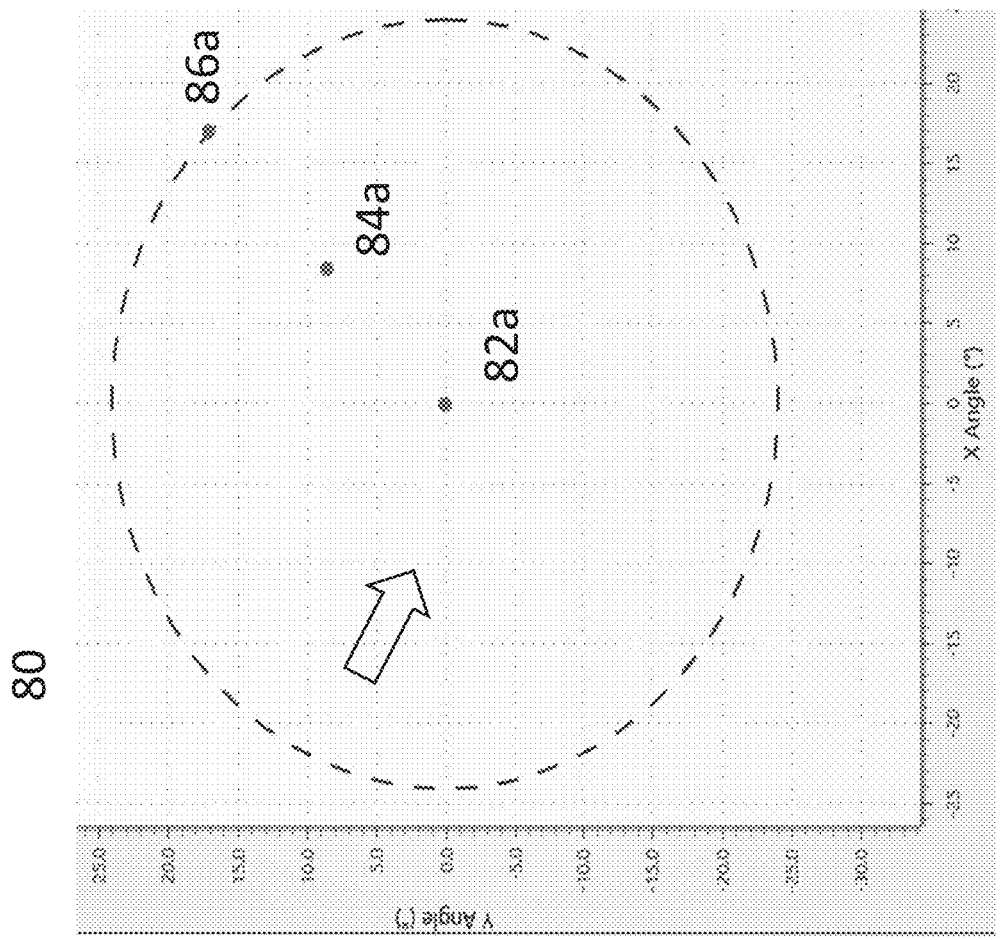
FIGS. 4A(i), 4B(i) and 4C(i) are diagrams illustrating three exemplary points in the angular field of view of the display of FIGS. 1A-1C.

The image of the display system without compensation typically has substantial aberrations. The most dominant aberration for this configuration is typically the 'field curvature'. FIGS. 4A(i)-4A(iii) shows a conventional approach to minimizing the distortions due to field curvature.

FIG. 4A(i) is a diagram 80 illustrating the angular field of the system and three points selected for analysis: the center of the field 82, a point at a mid-radius of the field 84 and an edge of the field 86. FIG. 4A(ii), graph 90, shows the field curvature, where the x axis is the local focal distance and the y axis is the radius in the field. Curves 92 and 96 show the sagittal and tangential focal distance, respectively, where line 96 represent the location of the system (position of actual transmitted image plane). The distances from 96 to 92 and 96 represent local defocusing, resulting in a non-collimated image at the corresponding specific field location. Minimization of this distortion across the field is conventionally achieve by optimizing image plane for point 84a (marked with arrow) so on plot 90 has minimal distance at 84b. This way, the defocus represented by the distance from 82b and 86b to line 96 averaged over the entire field is minimized.

This solution is clearly imperfect, as illustrated in plots 100 in FIG. 4A(iii), which show the central wavelength (green) spots for 82a as 82c and similarly 84c and 86c for point 84a and 86a, respectively. It is apparent that 84 is the best quality (focused) while the other image points have more considerable spread. Consequently, image quality is degraded at the center and edges of the field.

According to an aspect of the present invention, dynamic adjustment of focus is performed according to a current line of sight of the observer's eye, so that the focus is optimized for the region at which the observer is currently looking (referred to as the current region of interest, or the "foveal region"), at the expense of reduced quality in the regions currently in the observer's peripheral vision. This approach is effective to enhance the perceived image quality over the entire field of view, while taking advantage of the relative insensitivity of peripheral human vision to image quality, such that further image degradation in the peripheral vision is well tolerated.

Figure 4B:
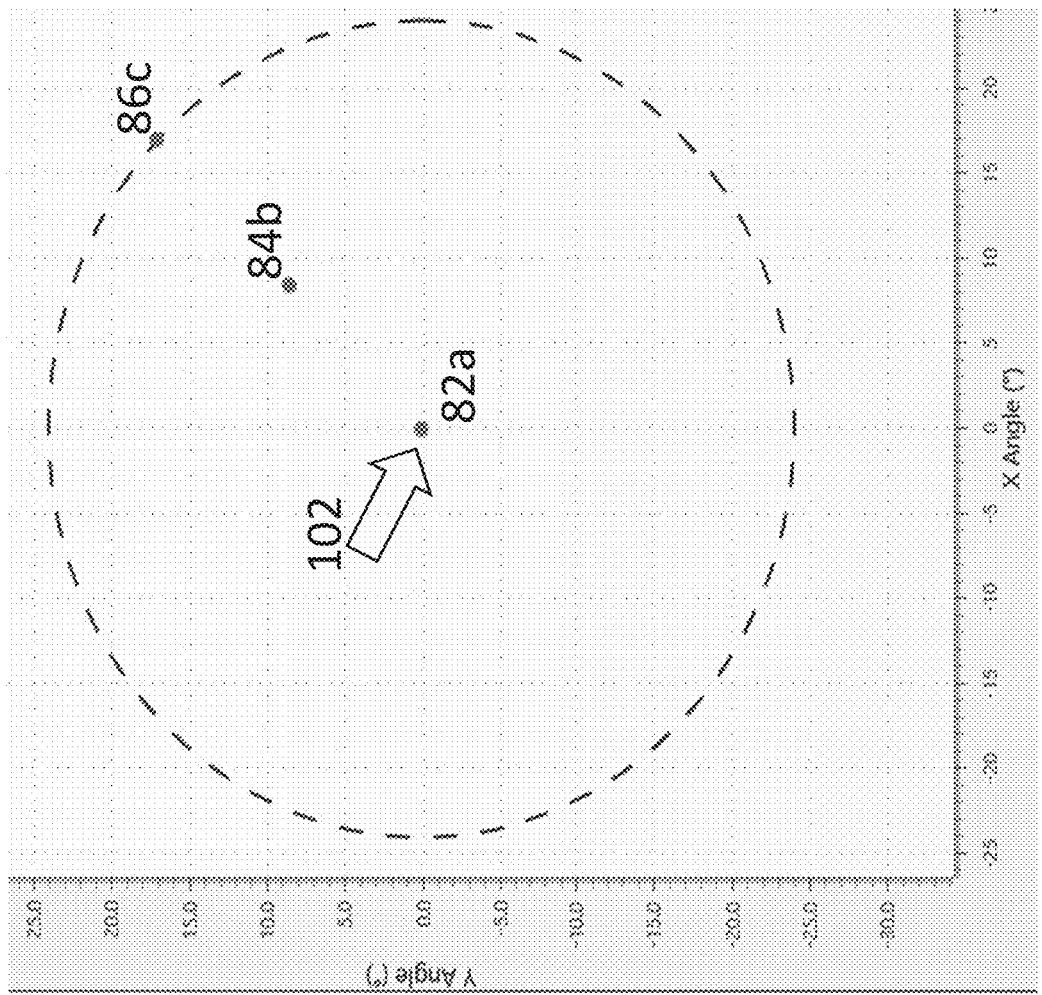
FIG. 4C(iv) is a plot illustrating chromic separation of a white dot according to an implementation of a variable lens correction of FIG. 4C(ii)

Thus, when the eye tracker detects that line-of-sight is at center of field (indicated by arrow 102 in FIG. 4B(i)), varying device 58B is activated at, for example, −½ diopter, in order to shift the focus to be optimal at this field of interest. (In this example, if the active optical device is deployed at 58B of FIG. 3, then half of the optical power needed.) Plot 104 of FIG. 4B(ii) shows the adjusted focus across the field, showing that the focus in the region of 82b intersects line 96, indicating that this region of the image is correctly collimated at the input to the light-guide optical element. FIG. 4B(iii) shows the resulting point spread functions for the three reference points, showing significant improvement in central field spot 82c and substantial degradation in edge of field 86c. Although not apparent in this illustration, the spot size is also slightly degraded at mid-field 84c.

Figure 4C:
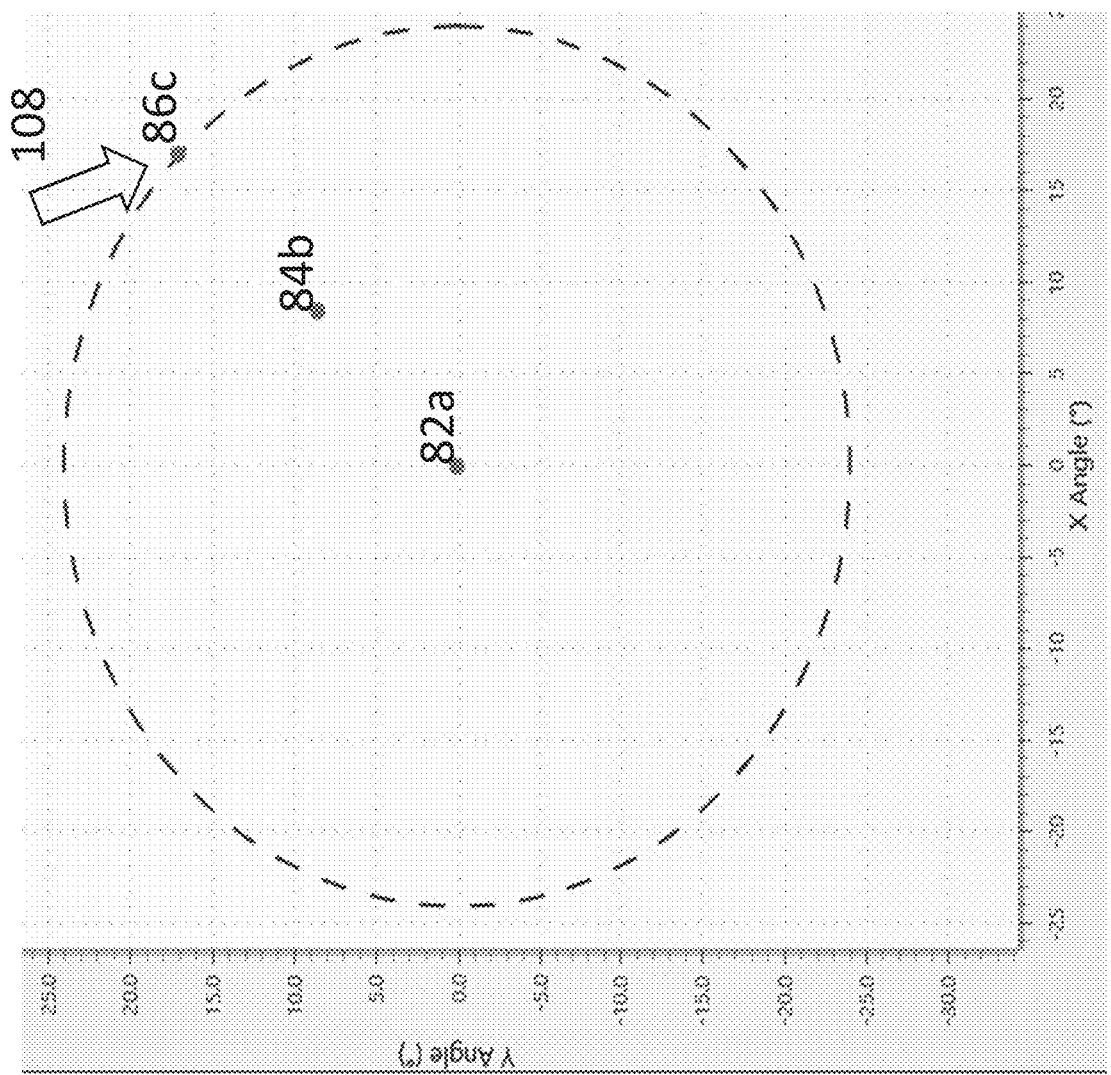

When the region of interest changes to the edge of the field (FIG. 4C(i), arrow 108), then optical varying device 58A is adjusted, for example, to +1 diopter (or a device at 58B by half that amount), resulting in a corresponding improvement to image quality near the edge of the field, as shown in FIGS. 4C(ii) and 4C(iii), plots 110 and 112. In this case, the improvement is at the cost of reduced image quality in the center field (which is currently "peripheral" to the observer's vision).

In certain cases, the effective optical power of optically varying device 10 varies with wavelength, such that it may impact differently different colors making up a color projected image. In FIG. 4C(iv), plot 114 illustrates schematically, and in enlargement, spots of the red, green and blue color separations making up a white pixel in the image during the +1 diopter correction mentioned above. It is apparent that in this example (which is thought to be typical, but is non-limiting) all colors are effectively corrected for their focus, but have different magnification (appearing here as a sharp spot but shifted relative to each other) in the field of interest. This can be compensated by:

1. Introducing different magnification to the digital image processor in order to generate an equal but opposite displacement in the image data information for one or more of the colors; or
2. If the colors are illuminated in sequence, and if the response time of the adjustable lens is sufficiently rapid (such as with LCD lens technology), the optical power of varying device 58 can be changed for every color illumination to compensate for this magnification variation.

More complicated aberration compensation (such as combinations of astigmatism and spherical) require a more complicated optical profile to be generated by varying device 58. This can be achieved, for example, by using an LCD lens produced by DeepOptics Ltd. (Israel).

Other optical configurations and display technologies can also use the above approach of adjusting focus and/or polarization and/or other optical properties which impact image quality across the field of view according to a currently derived region of interest, which may be derived from an input from an eye tracker or determined from the image content, and adjusts the properties to provide an improved image in the current region of interest. Other relevant technologies include but are not limited to laser scanners into waveguide and micro LED based projectors.

The variable lens or lenses can be placed at other locations besides the exemplary locations shown in FIG. 3, as will be exemplified below.

Turning now to polarization-adjusting device 13, some waveguide-based near-eye displays present image non-uniformity when polarized light is injected into the waveguide. Device 13 in FIGS. 1 and 59 in FIG. 3 depict a polarization management device which preferably controls the exit polarization to achieve improved image uniformity in the field of interest. In this case, a look-up table should be stored in driver memory 26 defining optimal polarization state for various parts of the field. The table can be determined empirically based on laboratory tests performed once for each product, or may be derived based on theoretical calculations, with or without empirical confirmation. The driver then actuates device 59 to generate a state of polarization according to the field of interest (e.g., current line of sight). It should be noted that the focus correction and the polarization correction are each considered of patentable significance in their own right, but may be used together with particular synergy.

Astigmatic Correction

Astigmatism can exist in circularly symmetric optics, and becomes significant in a case of optics misalignment or if cylindrical optics exist in the system. FIG. 5A(i) shows the aberrations of field point 86C of the system in FIG. 3, when a 1 mm misalignment is introduced to the entrance pupil. Plot 150 shows the tangential aberration, where the x axis is the ray position in the aperture and the y axis is position of this ray in the focal plane. In this plot a flat line represents minimal aberration. It is apparent that plot 150 is tilted which represent defocus of these rays. Plot 152 shows curved but relatively flat plot of the sagittal rays. These aberration plots translate to a focal spot 154 having elongated shape (FIG. 5A(ii)).

To correct for these aberrations, a cylindrical correction is preferably added to the circularly symmetric correction of device 58A, the cylindrical correction having a focal length of 1.3 meters. This independent cylindrical correction can be introduced by an additional LCD layer having cylindrical optical power. As a result, the tangential rays 156 are corrected (flatter plot) while the sagittal rays 158 are unchanged (FIG. 5B(i)). This results in a reduction of the spot height, as seen in 160 (FIG. 5B(ii)).

Laser-Scanning Implementations with Reduced-Dimension Variable Focus Lens

Where a laser scanning system is used to generate the projected image, the small dimensions of the beam in the optical path near or prior to the scanning arrangement allows the use of a particularly compact variable focus lens, thereby relaxing design requirements and allowing for faster response time.

Figure 6A:
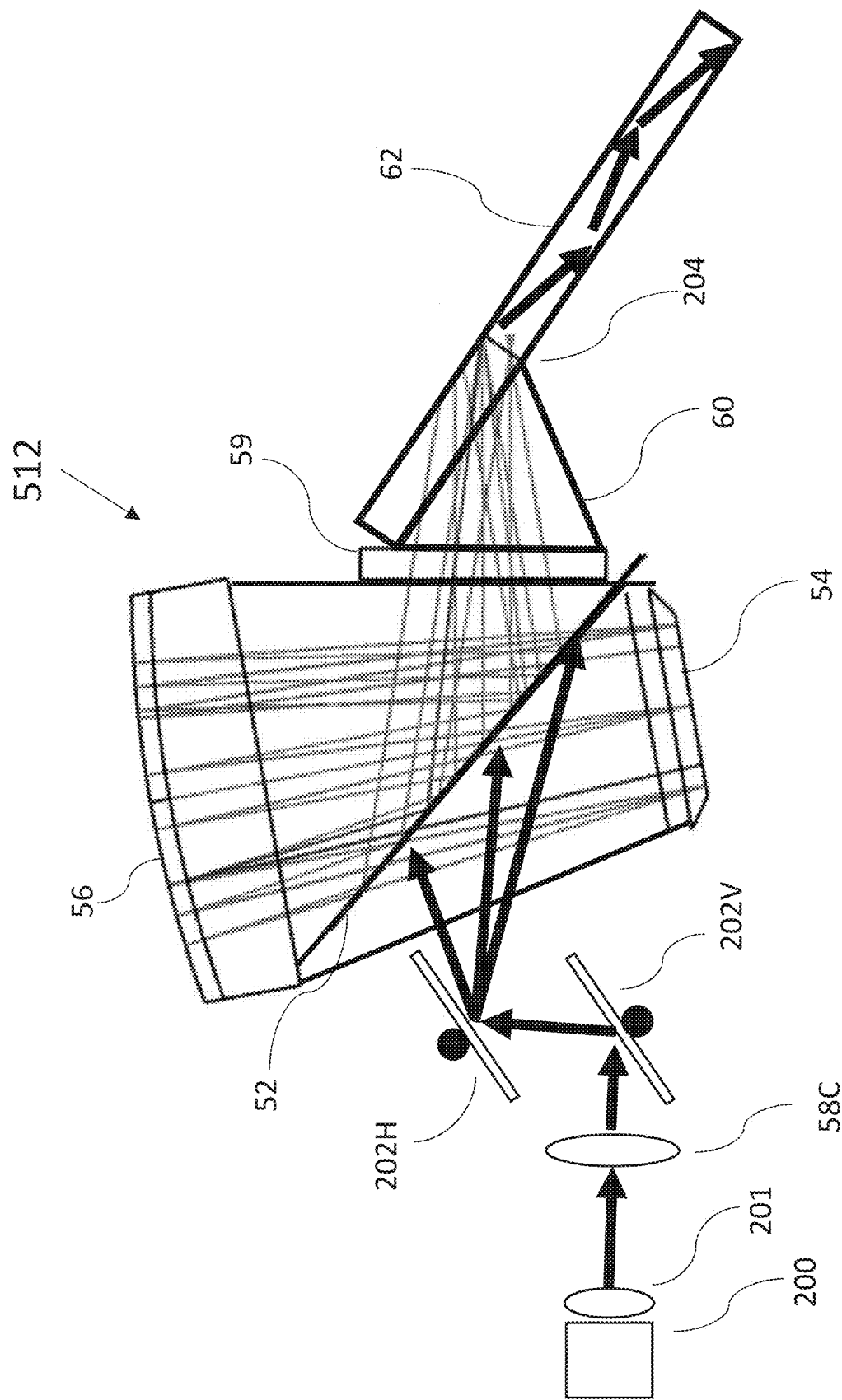
FIG. 6A is an enlarged partial view of an image projector according to an implementation of the system of FIGS. 1A and 1B illustrating positioning of adjustable optical devices according to an embodiment of the present invention employing a scanning laser image generator.

An exemplary laser scanning system is shown in FIG. 6A. Laser 200 with collimating optics 201 transmits light onto scanning mirrors 202V (vertical) and 202H (horizontal) resulting in a scanning beam (schematically shown as diverging arrows from 202H) and onto collimating optics similar to that illustrated above with reference to FIG. 3. In this case, element 54 may be a mirror, preferably combined with a diffuser, or most preferably a micro-lens array (MLA), defining an image plane with subsequent controlled divergence of the laser illumination. It should be noted that the PBS prism-based optics illustrated here is non-limiting, and that a free-space optics implementation employing refractive lenses and a micro-lens array through which light is transmitted, is fully equivalent to the configuration illustrated here, and may in some cases be preferred. Where free-space transmissive optics is used, a polarization manipulator (polarization varying device 13, above), if used, can be implemented at any point along the optical path since in this configuration there is typically no optical sensitivity of the image projector components to polarization.

In order to maintain the coupling of the laser beam into the waveguide, the waveguide entrance pupil 204 is imaged as close as possible to mirrors 202, in an optical arrangement referred as 'pupil imaging'. Lens 58C is a variable focus lens. It can be implemented using any of the aforementioned technologies, including but not limited to, a liquid-crystal-lens, such as those commercially available from Deep-Optics Ltd. (Israel) or an electrostatic actuated lens, such as those marketed under the name VARICOTIC® by Corning© or Optotune©. Alternatively, in any of the implementations described herein which employ reflective optical elements, a variable optical element may be implemented as a variable curvature reflector, for example, replacing surface 56. This can be implemented by coating an electrostatic lens with a reflective coating. For the purpose of this description, the exemplary devices will be illustrated here with variable lenses, but in each case, it should be appreciated that variable optical power reflectors are also applicable. All these variable lenses have a faster response when having a smaller active aperture.

In the case of very low optical power, the variable lens 58C can be incorporated with laser lens 201. Where multiple color lasers (red, green and blue) are projected along the same axis, the variable lens is preferably located on the common light path, after multiplexing to combine all of the beams. Details of the laser implementation are not shown here.

It is apparent from FIG. 6A that the spatial extent of the laser beam is most narrow at locations near and before scanning mirrors 202. Therefore, by placing variable lens 58C at these locations, a small optical aperture lens (for example, having a diameter in the order of 1 mm) can be used. This facilitates implementations with a fast response time of the variable optics.

Figure 6B:
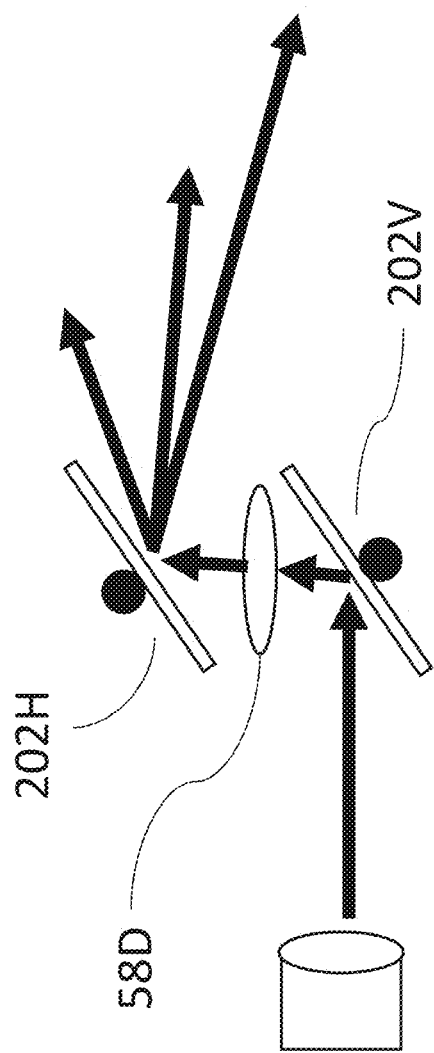
FIGS. 6B and 6C are partial views of alternative deployment locations for a variable lens according to variant implementations of the system of FIG. 6A.
Figure 6C:
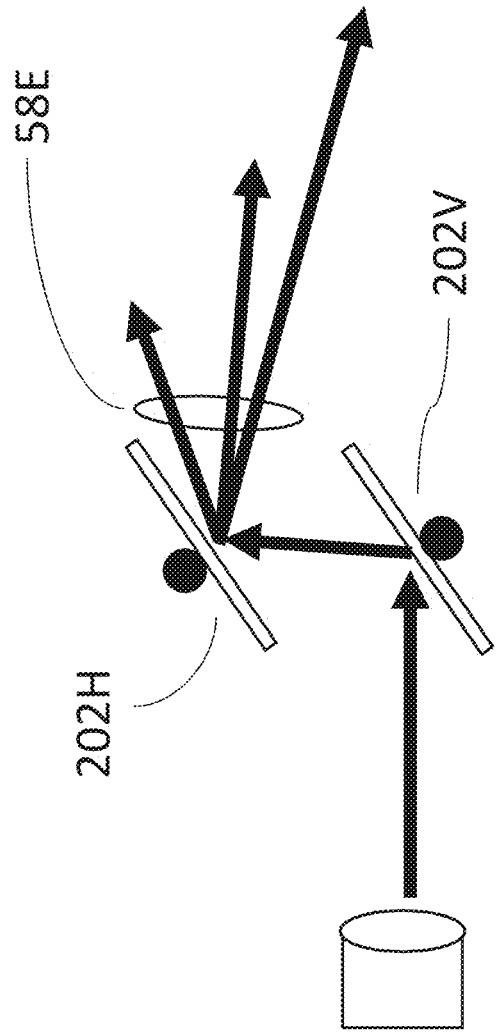

The optical power variation required from lens 58C is relatively low, so it doesn't change substantially the divergence and width of the laser beam. A further option is placing this lens close to mirrors 202V/H, which also has minimal impact on beam size on the mirrors and minimal degradation of pupil imaging arrangement. Consequently, minimal loss of power at the mirrors and at pupil 204. FIG. 6B shows schematically an arrangement where a variable lens 58D is in-between mirrors 202V/H and FIG. 6C shows a variable lens 58E after mirrors 202V/H, but sufficiently close to the mirrors that the spatial spread of the scanning beams is still relatively small and a small variable lens can be used.

Figure 7:
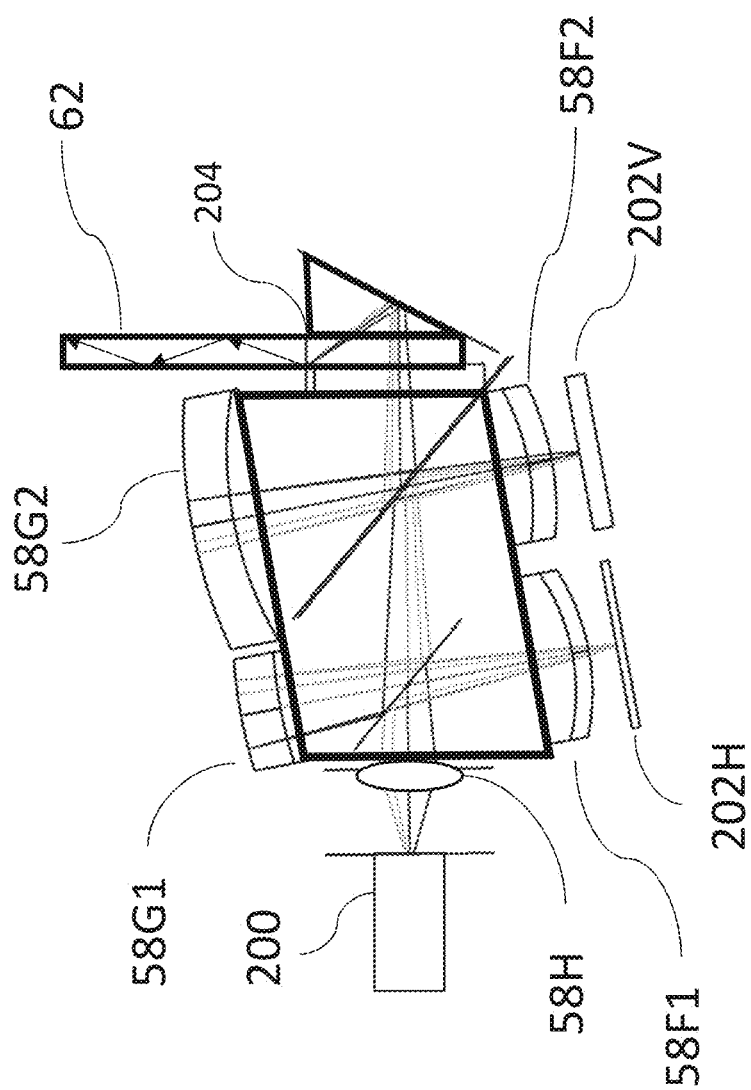
FIG. 7 is a schematic side view of a further alternative implementation of an image projector for the system of FIGS. 1A and 1B employing a scanning laser image generator with double pupil imaging.

Various optical architectures based on reflective and/or transmissive optics can be used for implementing the display system in general, and specifically the variable lens. FIG. 7 shows another example of an optical arrangement having double pupil imaging. Waveguide 62 entrance pupil 204 is imaged onto mirror 202V and imaged once again to mirror 202H. The variable optics can be implemented integrated with, or adjacent to, lenses 58F1 and 58F2 or to reflectors 58G1 and 58G2. More than one variable lens can be used, for example a cylindrically variable LCD can be used at 58F1 and an orthogonally oriented cylindrical variable LCD at 58F2. A cylindrical or spherical variable lens can also be implemented using any suitable technology (LCD and electrostatic, for example).

Lens 58H can also be implemented as a variable lens, as previously described, optionally combined with the laser optics.

Figure 8:
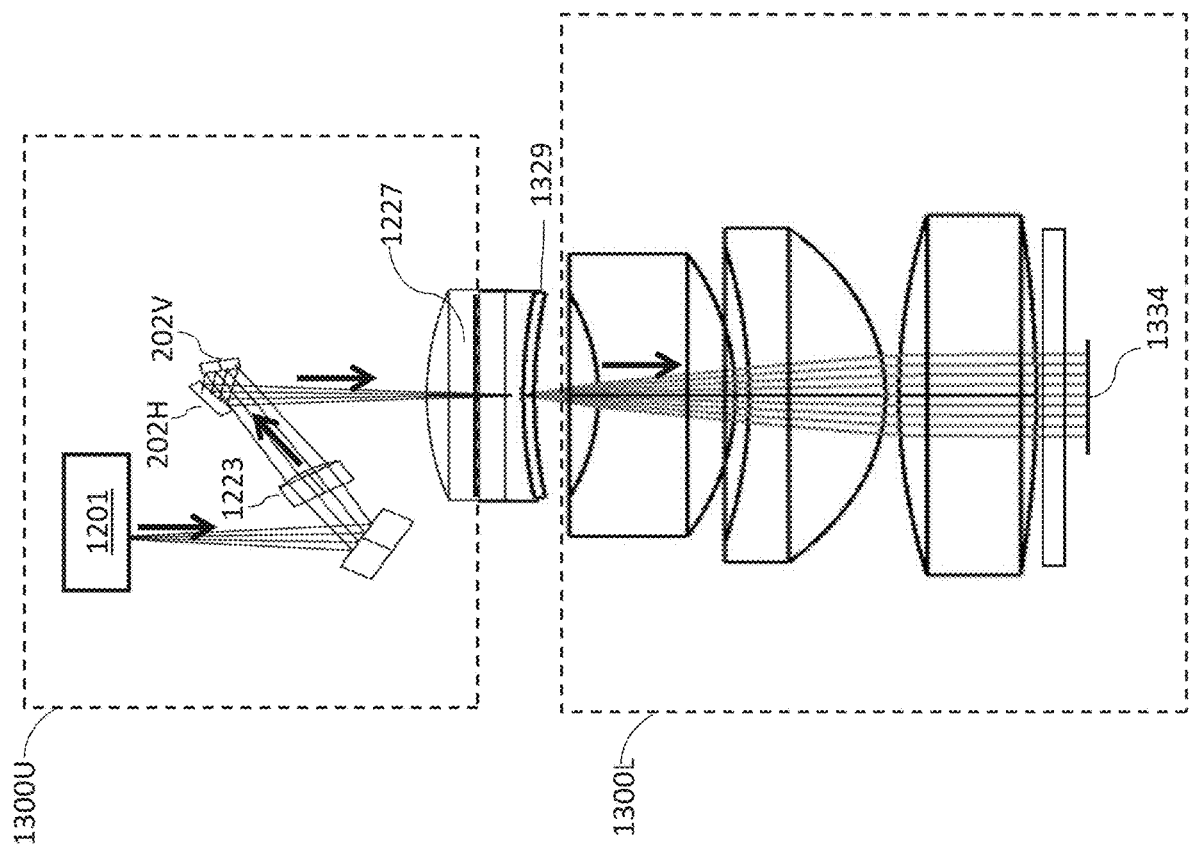
FIG. 8 is a further schematic side view of a further alternative implementation of an image projector for the system of FIGS. 1A and 1B employing a scanning laser image generator with double pupil imaging.

Turning now to FIG. 8, in some cases of laser scanning image projectors, the projector can be treated as two optical subsections: laser section 1300U from a scanning laser 1201 to the micro-lens-array (MLA) 1329; and a relay section from the MLA to the exit pupil 1334 (entrance pupil to the waveguide). In order to minimize field curvature aberration on the relay section, the MLA 1329 can be produced on a curved section as shown. However, this curvature does not correspond to the preferred curvature for the laser section. Therefore, according to an aspect of this invention, lens 1223 can be set to be adaptive to generate optimal laser beam focus on the appropriate section of the MLA (thereby field of interest). This lens is small therefore fast modification is possible. Placing this lens near the scanning mirrors is preferable. Alternatively, lens 1227 can be set to be adaptive but, in this case, a larger lens is required.

Active optical compensation of the laser section is also preferable since thermal gradients induced by the laser source may otherwise distort the laser section optics more than the relay section.

In this example, laser 1201 may be implemented as a plurality of side by side lasers (for example red, green and blue). These lasers will be close to each other, and therefore have almost the same field curvature. In this case, the compensation implemented by 1223 can be set as an average for the position of the three lasers, or according to the centrally positioned one of the adjacent lasers.

The relay subsection 1300L from the MLA to the exit pupil may be regarded as an independent optical system, and may optionally be provided with an additional variable lens (typically integrated with one of the lenses illustrated here) to provide additional correction of aberrations and/or polarization adjustment.

Non-Directional Correction

The examples of the invention described thus far have all included identification of a current region of interest which varies dynamically with eye motion and/or image content. It should be noted, however, that inclusion of an electrically-controllable variable lens and corresponding controller may be used to advantage according to various additional aspects of the invention even where corrections are made globally for the entire field. Examples of such corrections include, but are not limited to, correction for variations caused by temperature changes, calibration corrections which are made to compensate for manufacturing tolerances, and focus according to a user input which allows correction of degradation of image quality which may occur due to a range of factors over a period of time. In each of these cases, the correction provided here is performed at the image projector level, i.e., prior to entry of the image illumination into the LOE, and enhances the collimation of the image injected into the LOE.

Thus, according to a further aspect of the present invention, corresponding for example to a subset of features from FIGS. 1A-1C, a display system for displaying an image to an eye of a user includes LOE 506 and image projector 512, all as described above, and including an electrically-controllable variable lens 10 having variable optical power along at least one axis. A temperature sensor 24 is integrated with the system, typically as part of the optics housing, to generating a signal indicative of a temperature of at least part of the display system. The controller 18 (all as described above) is responsive to the signal indicative of a temperature to generate an actuation signal to vary the optical power so as to at least partially compensate for temperature-related variations in optical properties of the image projector. The correction is typically retrieved from a look-up table stored in data storage device 26, also as discussed above.

Additionally, or alternatively, a factory-set correction (or corresponding adjustment to the look-up table) may be provided based on a post-production calibration process, allowing compensation for a range of cumulative errors or aberrations which may arise due to component tolerances and/or assembly variability in a mass production process.

Additionally, or alternatively, a user input (not shown) may be provided to allow user feedback to the controller 18 for focus adjustment. This manual focus adjustment input can provide calibration to compensate for degradation of optical quality of the device over time. The controller is thus responsive to a user input provided via a user input device during a calibration process to store a new value indicative of a required correction for manufacturing tolerances of the image projector.

It will be appreciated that the above descriptions are intended only to serve as examples, and that many other embodiments are possible within the scope of the present invention as defined in the appended claims.

What is claimed is:

1. A display system for displaying an image to an eye of a user, the eye being located within an eye motion box, the display system comprising:
   (a) a light-guide optical element (LOE) having a pair of major external surfaces that are parallel;
   (b) an image projector projecting image illumination of a collimated image, said image projector being optically coupled to said LOE so as to introduce said image illumination into said LOE so as to propagate within said LOE by internal reflection at said pair of major external surfaces, said image projector including an electrically-controllable variable lens;
   (c) a coupling-out configuration associated with at least a coupling-out region of said LOE, said coupling-out configuration being configured to redirect at least part of said image illumination propagating within said LOE towards the eye motion box for viewing by the eye of the user; and
   (d) a controller comprising at least one processor, said controller associated with said electrically-controllable variable lens and configured to:
      (i) determine a current region of interest of the image, and
      (ii) generate an actuation signal to vary a property of said electrically-controllable variable lens so as to reduce at least one type of aberration in the current region of interest of the image as viewed by the eye of the user at the expense of increased aberration in at least one area of the image outside the current region of interest.

2. The display system of claim 1, further comprising an eye tracking arrangement deployed for tracking a current line of sight of the eye of the user, and wherein said controller determines the current region of interest based upon an input received from said eye tracking arrangement.

3. The display system of claim 1, wherein the image is a video image, and wherein said controller processes content of the video image to derive the current region of interest.

4. The display system of claim 1, wherein the image is a video image, and wherein said controller receives a data stream indicative of a current region of interest associated with the video image.

5. The display system of claim 1, wherein the at least one optical aberration varies across a field of the collimated image from said image projector, and wherein said electrically-controllable variable lens has a variable optical power along at least one axis, said controller varying said optical power so as to reduce said at least one optical aberration in a region of said collimated image corresponding to the current region of interest.

6. The display system of claim 5, further comprising a temperature sensor generating a signal indicative of temperature, wherein said controller is responsive to said signal indicative of temperature to vary said optical power so as to at least partially compensate for temperature-related variations in optical properties of said image projector.

7. The display system of claim 5, wherein said image projector sequentially projects image illumination for different colors in different time periods, and wherein said controller varies said optical power synchronously with said time periods to provide color-specific aberration compensation.

8. The display system of claim 5, wherein said controller is further configured to store a value indicative of a required correction for manufacturing tolerances of the image projector, said controller being further configured to actuate said electrically-controllable variable lens to provide both a correction for the manufacturing tolerances of said image projector and to reduce said at least one optical aberration in a region of said collimated image corresponding to the current region of interest.

9. The display system of claim 8, further comprising a user input device associated with said controller, and wherein said controller is responsive to a user input provided via said user input device during a calibration process to store a new value indicative of a required correction for manufacturing tolerances of the image projector.

10. The display system of claim 1, wherein a focal field of the collimated image from said image projector is non-uniform, and wherein said electrically-controllable variable lens has a variable focal length, said controller varying said focal length so as to enhance collimation of said collimated image in the region of interest.

11. The display system of claim 1, wherein a uniformity of the image observed at the eye motion box varies across the field of the image as a function of a polarization of the image illumination introduced into said LOE, and wherein said electrically-controllable variable lens is a variable polarization-modifying lens, said controller varying said variable polarization modifying lens so as to reduce non-uniformity in a region of the image corresponding to the current region of interest.

12. The display system of claim 1, wherein said image projector comprises a narrow beam illumination source and a scanning arrangement for generating a scanning pattern of said narrow beam across the angular field of the image, and wherein said electrically-controllable variable lens is deployed in a light path between said narrow beam illumination source and said scanning arrangement or is adjacent to said scanning arrangement.

13. The display system of claim 1, wherein said image projector comprises a spatial light modulator and collimating optics, and wherein said electrically-controllable variable lens is deployed in a light path between said collimating optics and said LOE or is integrated with said collimating optics.

14. The display system of claim 1, wherein said image projector comprises:
  (a) a narrow beam illumination source;
  (b) a scanning arrangement for generating a scanning pattern of said narrow beam across the angular field of the image so as to generate a real image at an image plane; and
  (c) collimating optics collimating image illumination from the image plane so as to be introduced into said LOE as a collimated image, wherein said electrically-controllable variable lens is deployed in a light path between the image plane and said LOE,
and wherein the display system further comprises a second electrically-controllable variable lens deployed in a light path between said narrow beam illumination source and the image plane.

15. A method for displaying an image to an eye of a user, the eye being located within an eye motion box, the method comprising the steps of:
  (a) providing a display system comprising:
    (i) a light-guide optical element (LOE) having a pair of major external surfaces that are parallel,
    (ii) an image projector projecting image illumination of a collimated image, said image projector being optically coupled to said LOE so as to introduce said image illumination into said LOE so as to propagate within said LOE by internal reflection at said pair of major external surfaces, said image projector including an electrically-controllable variable lens, and
    (iii) a coupling-out configuration associated with at least a coupling-out region of said LOE, said coupling-out configuration being configured to redirect at least part of said image illumination propagating within said LOE towards the eye motion box for viewing by the eye of the user,
  (b) determining a current region of interest of the image; and
  (c) varying a property of said electrically-controllable variable lens as a function of the current region of interest of the image so as to reduce at least one optical aberration in the region of interest at the expense of a reduction in viewed image quality in at least one other region of the image.

16. The method of claim 15, wherein the current region of interest is determined by sensing a current line of sight of the eye of the user.

17. The method of claim 15, wherein the image is a video image, and wherein the current region of interest varies as a function of the content of the video image.

* * * * *